US011353094B2

(12) United States Patent
Voegeli

(10) Patent No.: US 11,353,094 B2
(45) Date of Patent: Jun. 7, 2022

(54) MULTIPLE-RODRACK ASSEMBLY FOR MOTION CONVERSION TECHNOLOGY

(71) Applicant: CV Group, LLC, Oak Harbor, WA (US)

(72) Inventor: Ronald C. Voegeli, Oak Harbor, WA (US)

(73) Assignee: CV Group, LLC, Oak Harbor, WA (US)

( * ) Notice: Subject to any disclaimer, the term of this patent is extended or adjusted under 35 U.S.C. 154(b) by 0 days.

(21) Appl. No.: 16/980,520

(22) PCT Filed: Aug. 30, 2018

(86) PCT No.: PCT/US2018/048841
§ 371 (c)(1),
(2) Date: Sep. 14, 2020

(87) PCT Pub. No.: WO2019/177659
PCT Pub. Date: Sep. 19, 2019

(65) Prior Publication Data
US 2021/0018076 A1  Jan. 21, 2021

Related U.S. Application Data

(63) Continuation-in-part of application No. PCT/US2018/022672, filed on Mar. 15, 2018.

(51) Int. Cl.
*F16H 19/04* (2006.01)
*F01B 1/08* (2006.01)
(Continued)

(52) U.S. Cl.
CPC ............. *F16H 19/043* (2013.01); *F01B 1/08* (2013.01); *F01B 9/047* (2013.01); *F02B 63/06* (2013.01);
(Continued)

(58) Field of Classification Search
CPC .......... F16H 19/043; F16H 25/14; F01B 1/08; F01B 9/047; F02B 75/24; F02B 75/32
See application file for complete search history.

(56) References Cited

U.S. PATENT DOCUMENTS

| 4,803,964 A * | 2/1989 | Kurek ...................... F01B 9/047 |
| | | 123/192.1 |
| 6,981,483 B1 * | 1/2006 | Keip ....................... F02B 75/32 |
| | | 123/197.1 |

(Continued)

*Primary Examiner* — Terence Boes
(74) *Attorney, Agent, or Firm* — Panitch Schwarze Belisario & Nadel LLP; Erin M. Dunston

(57) ABSTRACT

A motion conversion apparatus (400, 500) comprises at least one set including a rodrack assembly (110) between two gearshaft member end sections (155), and a gearshaft member mid section (156) between the two gearshaft member end sections (155). The rodrack assembly (110) comprises a first gear connection member (120) and two guide members (140). The gearshaft member mid section (156) comprises a second gear connection member (160) configured to engage with the first gear connection member (120). The two gearshaft member end sections (155) each comprise a guiding surface arrangement (170) configured to contact the two guide members (140). The rodrack assembly (110) is configured to provide rotation of the gearshaft member mid section (156) about a rotational axis (A) by reciprocating linear motion of the rodrack assembly (110) along a first spatial dimension (D1) orthogonal to the rotational axis (A), or vice versa.

20 Claims, 22 Drawing Sheets

(51) Int. Cl.
*F01B 9/04* (2006.01)
*F02B 63/06* (2006.01)
*F02B 75/24* (2006.01)
*F02B 75/32* (2006.01)
*F16H 25/14* (2006.01)
*F16D 1/10* (2006.01)
*F16D 1/112* (2006.01)

(52) U.S. Cl.
CPC .............. *F02B 75/24* (2013.01); *F02B 75/32* (2013.01); *F16H 25/14* (2013.01); *F16D 1/10* (2013.01); *F16D 1/112* (2013.01); *F16D 2001/103* (2013.01)

(56) References Cited

U.S. PATENT DOCUMENTS

| | | | |
|---|---|---|---|
| 8,327,819 B2 | 12/2012 | Voegeli | |
| 2010/0282007 A1* | 11/2010 | Haka | F01B 9/047 74/11 |
| 2011/0005480 A1* | 1/2011 | Voegeli | F02B 75/24 123/53.6 |
| 2012/0291572 A1 | 11/2012 | Baker et al. | |
| 2021/0018075 A1 | 1/2021 | Voegeli | |
| 2021/0018076 A1* | 1/2021 | Voegeli | F02B 75/32 |

* cited by examiner

MULTIPLE-RODRACK ASSEMBLY FOR MOTION CONVERSION TECHNOLOGY

CROSS-REFERENCE TO RELATED APPLICATIONS

This application is a U.S. National Stage Application pursuant to 35 U.S.C. § 371 of International Patent Application PCT/US2018/048841, filed on Aug. 30, 2018, and published as WO 2019/177659 on Sep. 19, 2019, which claims priority to International Patent Publication No. PCT/US2018/022672, filed on Mar. 15, 2018, and published as WO 2019/177613 on Sep. 19, 2019, all of which are incorporated herein by reference in their entireties for all purposes.

TECHNICAL FIELD

The present disclosure relates to apparatuses for converting linear motion to rotational motion and vice versa, and more particularly a multiple-rodrack assembly for motion conversion.

BACKGROUND INFORMATION

Apparatuses for converting linear motion to rotational motion or rotational motion to linear motion are typically used in systems such as internal combustion engines, pumps and compressors, as well as various other applications. For example, internal combustion engines typically generate rotational motion by burning gasoline, oil, or other fuel with air to produce linear motion of pistons, and translating the linear motion of the pistons to rotational motion to rotate a power shaft. In addition, internal combustion engines typically involve undesirably high fuel consumption.

A need exists for an apparatus providing more efficient linear-to-rotational motion conversion and/or rotational-to-linear motion conversion, and increased transfer of power during linear-to-rotational motion conversion.

Constant velocity engine designs and technologies are described in U.S. Pat. No. 8,327,819, the entire contents of which are incorporated herein by reference.

SUMMARY

A motion conversion apparatus is disclosed. The motion conversion apparatus comprises at least one set including a rodrack assembly between two gearshaft member end sections, and a gearshaft member mid section between the two gearshaft member end sections. The rodrack assembly comprises a first gear connection member and two guide members. The gearshaft member mid section comprises a second gear connection member configured to engage with the first gear connection member. The two gearshaft member end sections each comprise a guiding surface arrangement configured to contact the two guide members. The rodrack assembly is configured to provide rotation of the gearshaft member mid section about a rotational axis by reciprocating linear motion of the rodrack assembly along a first spatial dimension orthogonal to the rotational axis, and/or the gearshaft member mid section is configured to provide reciprocating linear motion of the rodrack assembly along the first spatial dimension by rotational motion of the gearshaft member mid section about the rotational axis. The guiding surface arrangement is configured to simultaneously contact each of the two guide members during at least a portion of the reciprocating linear motion of the rodrack assembly.

BRIEF DESCRIPTION OF THE DRAWINGS

Other features and advantages disclosed herein will become more apparent from the following detailed description of exemplary embodiments when read in conjunction with the attached drawings.

DETAILED DESCRIPTION

Figure 1:
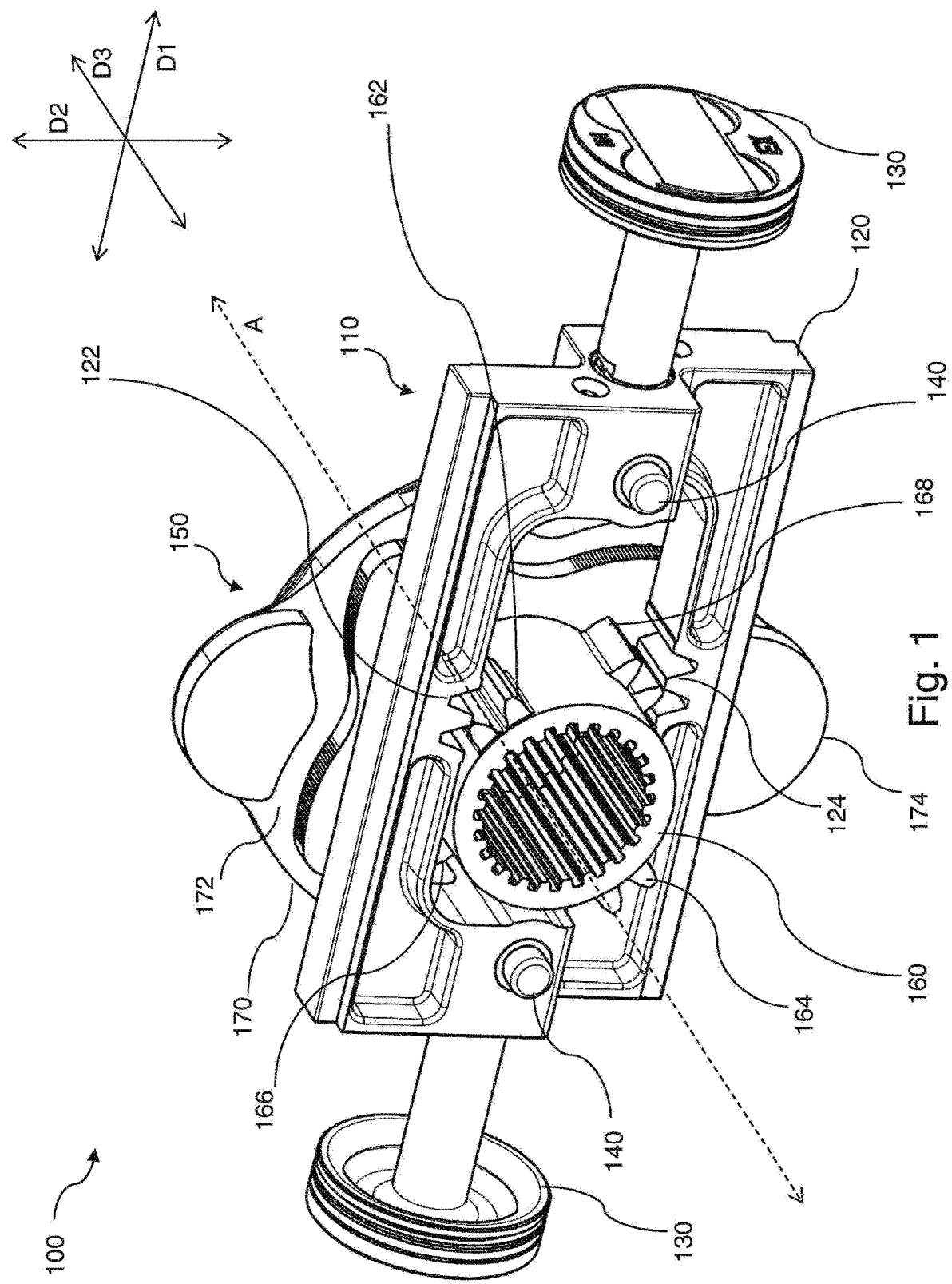
FIG. 1 is a schematic partial illustration of an exemplary embodiment of a motion conversion apparatus.

FIG. 1 shows an exemplary embodiment of a motion conversion apparatus 100.

Figure 2A:
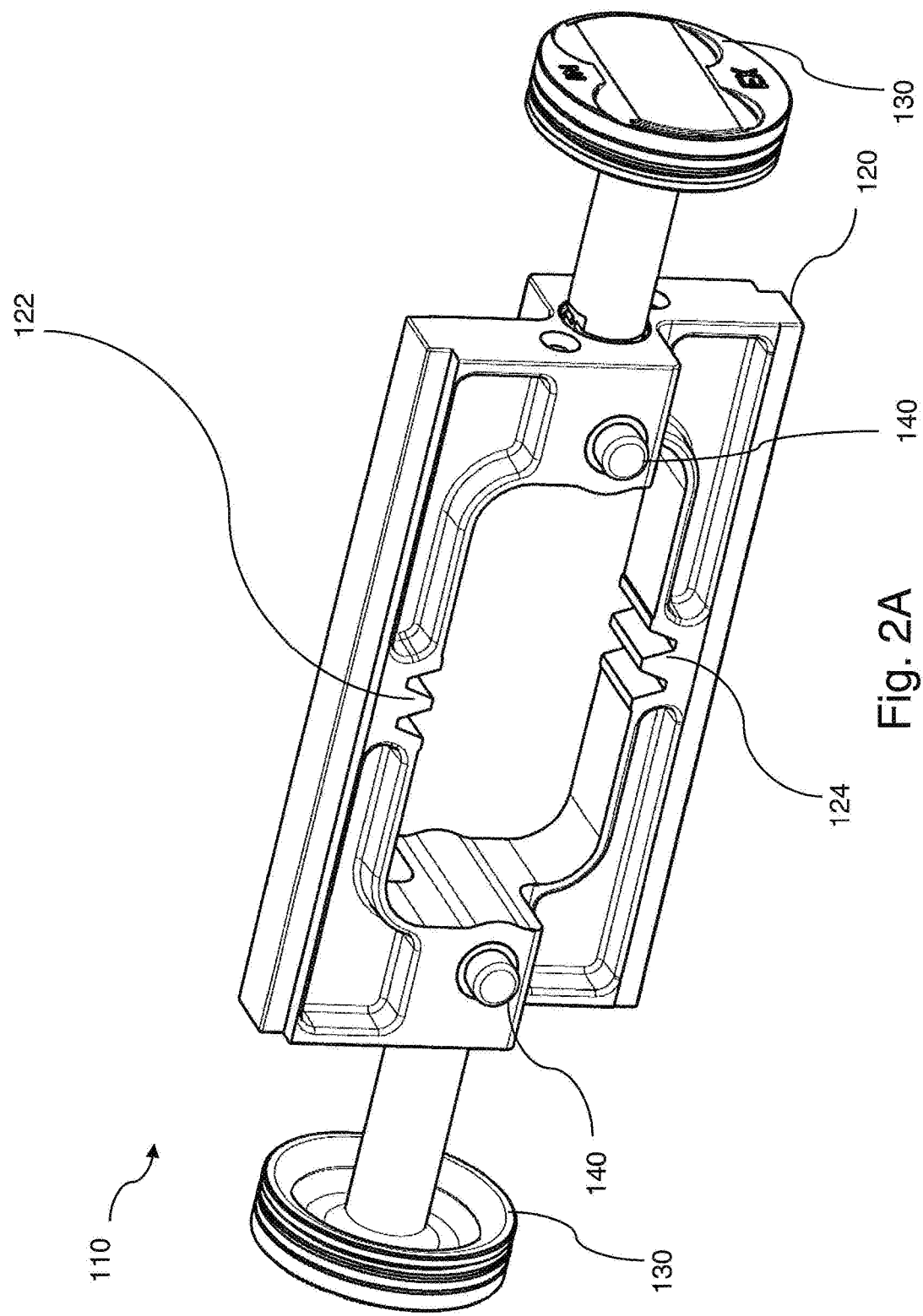
FIG. 2A is a schematic partial illustration of an exemplary embodiment of a rodrack assembly.
Figure 2B:
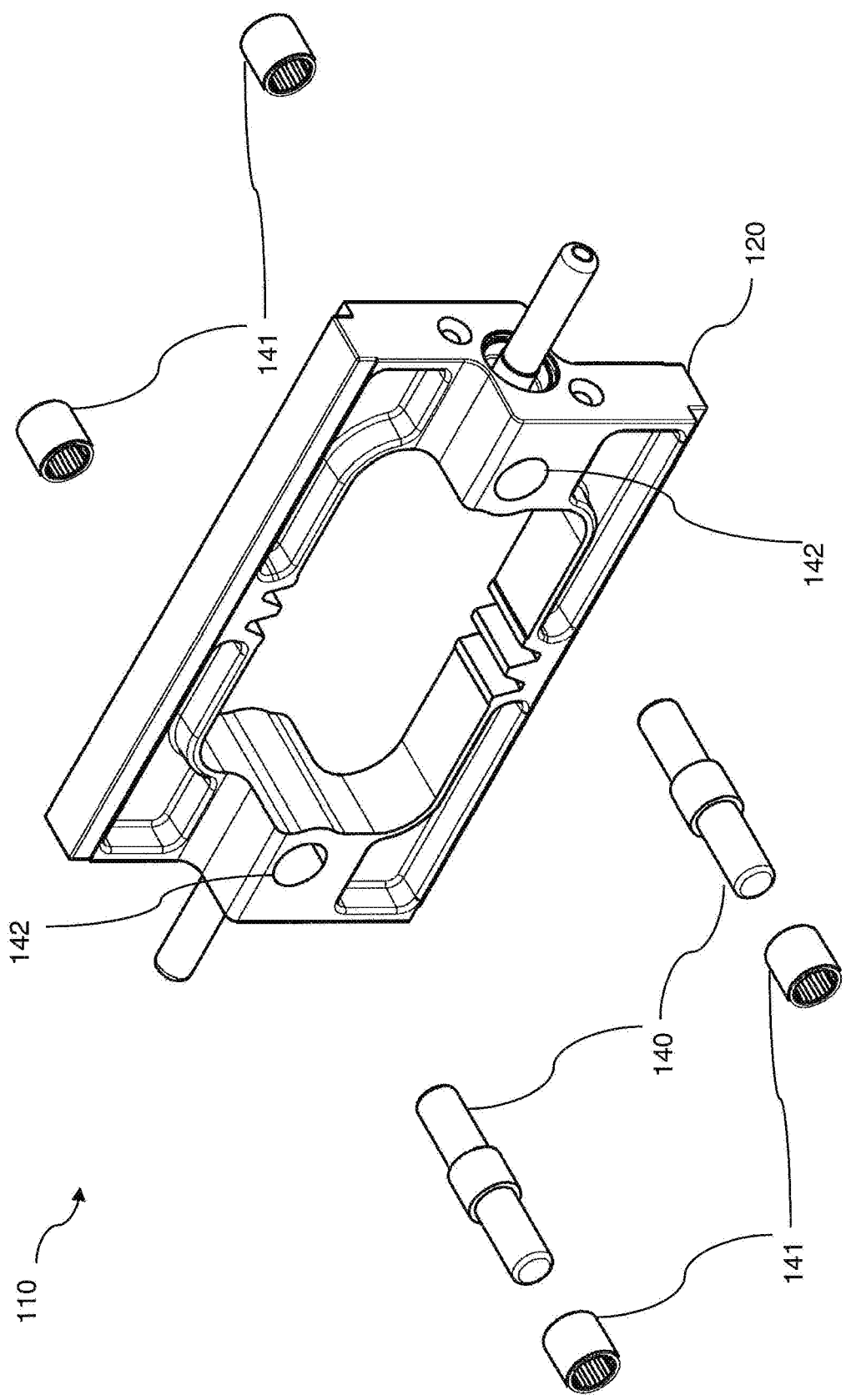
FIG. 2B is a schematic partial exploded view of an exemplary embodiment of a rodrack assembly.
Figure 3:
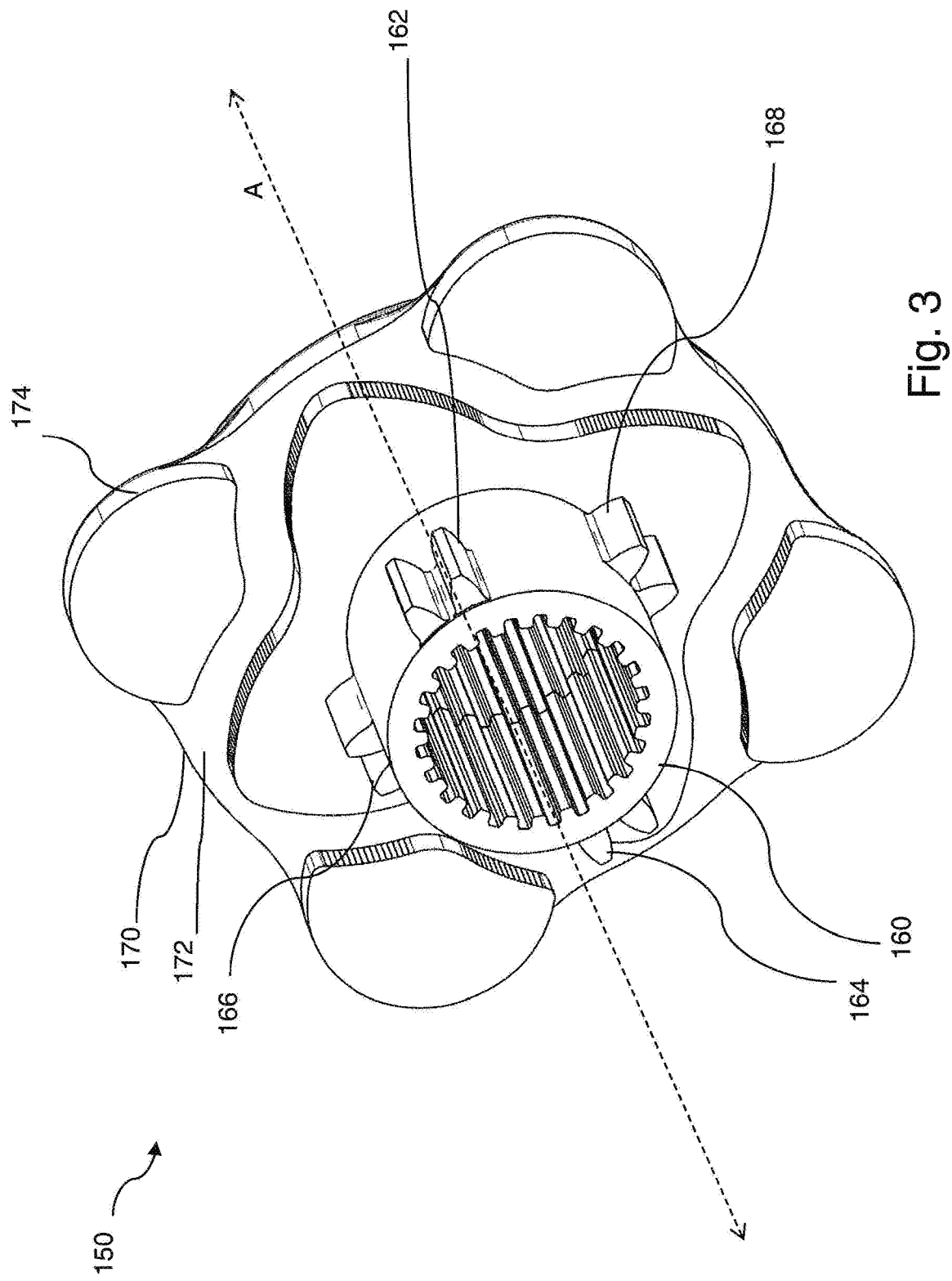
FIG. 3 is a schematic partial illustration of an exemplary embodiment of a gearshaft member.

In an exemplary embodiment, the motion conversion apparatus 100 comprises at least one rodrack assembly 110 (also illustrated in FIGS. 2A-B) and a gearshaft member 150 (also illustrated in FIG. 3).

In an exemplary embodiment, the rodrack assembly 110 comprises a first gear connection member 120 and two guide members 140.

In an exemplary embodiment, the gearshaft member 150 comprises a second gear connection member 160 configured to engage with the first gear connection member 120, and a guiding surface arrangement 170 configured to contact the guide members 140.

In an exemplary embodiment, the rodrack assembly 110 is configured to provide rotation of the gearshaft member 150 about a rotational axis A by reciprocating linear motion of the rodrack assembly 110 along a first spatial dimension D1 orthogonal to the rotational axis A, and/or the gearshaft member 150 is configured to provide reciprocating linear motion of the rodrack assembly 110 along the first spatial dimension D1 by rotational motion of the gearshaft member 150 about the rotational axis A.

In an exemplary embodiment, the guiding surface arrangement 170 is configured to simultaneously contact each guide member 140 during at least a portion of the reciprocating linear motion of the rodrack assembly 110.

In an exemplary embodiment, the first gear connection member 120 is located between at least one pair of opposing pistons 130 along the first spatial dimension D1. The opposing pistons 130 are configured to reciprocate along the first spatial dimension D1.

In an exemplary embodiment, the opposing pistons 130 are configured such that two strokes of a piston 130 move the gearshaft member 150 by 180 degrees (i.e., half a revolution).

In an exemplary embodiment, the guiding surface arrangement 170 comprises wall surfaces 173 of an interrupted central periodic groove 172, and an outer surface 174 of the gear shaft member 150.

In an exemplary embodiment, each of the two guide members 140 includes two opposite ends which each protrude from opposite sides of the first gear connection member 120. As such, each protruding end of a guide member 140 can engage with a respective gearshaft member 150.

In an exemplary embodiment, the guide members 140 are located on the first gear connection member 120.

In an exemplary embodiment, the guide members 140 include two shafts.

In an exemplary embodiment, the guiding surface arrangement 170 comprises wall surfaces 173 of an interrupted central periodic groove 172, and the shafts are configured to travel within the periodic groove 172 during the reciprocating linear motion of the rodrack assembly 110.

In an exemplary embodiment, each shaft is configured to spin along a longitudinal axis thereof. For example, each shaft can be attached to their supporting structure by bearing engagements or other mechanisms for allowing rotation of the shaft.

FIG. 2B shows an exploded view of an exemplary embodiment of a rodrack assembly 110. The first gear connection member 120 of the rodrack assembly 110 includes two openings 142 which each receive bearings 141 and a guide member 140. An exemplary assembly method involves inserting a first bearing 141 on one side of an opening 142, inserting a guide member 140 from the other side of the opening 142, and inserting a second bearing 141 from that other side of the opening 142, in order to hold the guide member 140 within the opening 142. Once all bearings 141 are pressed in place, the guide members 140 are allowed to rotate with the desired amount of end play.

In an exemplary embodiment, the distance between the two guide members 140 can be about equal to the distance between an inner wall surface 173 of an interrupted central periodic groove 172 of the gearshaft member 150 and the opposite outer surface 174 of the gearshaft member 150. In another exemplary embodiment, the distance between the two guide members 140 can be smaller, to substantially reduce or eliminate the risk of play between the gearshaft member 150 and the guide members 140.

In exemplary embodiments, using an outer surface 174 in addition to the interrupted central periodic groove 172 provides for a smoother and more efficient reversing linear motion (i.e., a smoother and more efficient transition from leftward motion to rightward motion of the rodrack assembly 110 and vice versa). In exemplary embodiments, such arrangement can also provide some or all of the following advantages: (1) the guide members 140 can turn in a substantially constant and continuous rotational direction, thus minimizing inefficiencies that would arise if the rotations of the guide members 140 were to significantly slow down; (2) the load of a guide member 140 need not change side of contact in the central periodic groove 172 when the rodrack direction is reversed; (3) noise associated with the load change of the groove side (e.g., a click or clatter) can be reduced; (4) there is more than one point of contact between the guide members 140 and the gearshaft member 150 as the rodrack assembly 110 reverses direction, thus reducing a wear point; and (5) it can be possible to attain a preload of guide member bearings in the rodrack assembly 110 as the guide members 140 engage in the groove 172 and with the outer surface 174.

In an exemplary embodiment, the first gear connection member 120 includes a first gear engagement 122 and a second gear engagement 124. The first gear engagement 122 and the second gear engagement 124 are opposed to one another in a second spatial dimension D2 parallel to the rotational axis A, and are offset from one another in the second spatial dimension D2 and a third spatial dimension D3. The first, second and third spatial dimensions D1, D2, D3 are orthogonal to one another, as indicated in FIG. 1. The second gear connection member 160 is disposed between the first gear engagement 122 and the second gear engagement 124 in the second spatial dimension D2.

In an exemplary embodiment, the second gear connection member 160 includes third, fourth, fifth and sixth gear engagements 162, 164, 166, 168. The third gear engagement 162 and the fourth gear engagement 164 face in opposite directions and are disposed on opposite surfaces of the second gear connection member 160 along a first diameter of the second gear connection member 160. The fifth gear engagement 166 and the sixth gear engagement 168 face in opposite directions and are disposed on opposite surfaces of the second gear connection member 160 along a second diameter of the second gear connection member 160. The third gear engagement 162 and the fourth gear engagement 164 are offset relative to the fifth gear engagement 166 and the sixth gear engagement 168 in the third spatial dimension D3, such that the first gear engagement 122 is engageable with the third gear engagement 162 and the fourth gear engagement 164, and the second gear engagement 124 is engageable with the fifth gear engagement 166 and the sixth gear engagement 168.

In exemplary embodiments, the gear engagements can include one or more teeth, grooves, sprockets, and/or sprocket engagement rollers, and/or any other gear engagements known in the art.

In an exemplary embodiment, the second gear connection member 160 extends through the reciprocating rodrack assembly 110.

In an exemplary embodiment, the rodrack assembly 110 is configured to provide constant rotation of the gearshaft member 150 by the reciprocating linear motion of the rodrack assembly 110.

In an exemplary embodiment, the gearshaft member 150 includes a central hole extending through the second gear connection member 160.

In an exemplary embodiment, the second gear connection member 160 is located between the guide members 140.

In an exemplary embodiment, a gearshaft member 150 for a motion conversion apparatus 100 comprises a second gear connection member 160 and a guiding surface arrangement 170. The second gear connection member 160 is configured to engage with a first gear connection member 120 of a rodrack assembly 110. The guiding surface arrangement 170 includes an interrupted central periodic groove 172 and an outer surface 174 of the gear shaft member 150. The gearshaft member 150 further comprises a third gear engagement 162, a fourth gear engagement 164, a fifth gear engagement 166 and a sixth gear engagement 168. The third gear engagement 162 and the fourth gear engagement 164 face in opposite directions and are disposed on opposite surfaces of the second gear connection member 160 along a first diameter of the second gear connection member 160. The fifth gear engagement 166 and the sixth gear engagement 168 face in opposite directions and are disposed on opposite surfaces of the second gear connection member 160 along a second diameter of the second gear connection member 160. The third gear engagement 162 and the fourth gear engagement 164 are offset relative to the fifth gear engagement 166 and the sixth gear engagement 168 in the third spatial dimension D3, such that a first gear engagement 122 of the first gear connection member 120 is engageable with the third gear engagement 162 and the fourth gear engagement 164, and a second gear engagement 124 of the first gear connection member 120 is engageable with the fifth gear engagement 166 and the sixth gear engagement 168.

FIGS. 4-7 show an exemplary embodiment of a motion conversion apparatus 100 during operation over four respective phases of a 90-degree counterclockwise rotation of the gearshaft member. A 90-degree rotation can be defined from Top Dead Center (TDC) to Bottom Dead Center (BDC).

Figure 4:
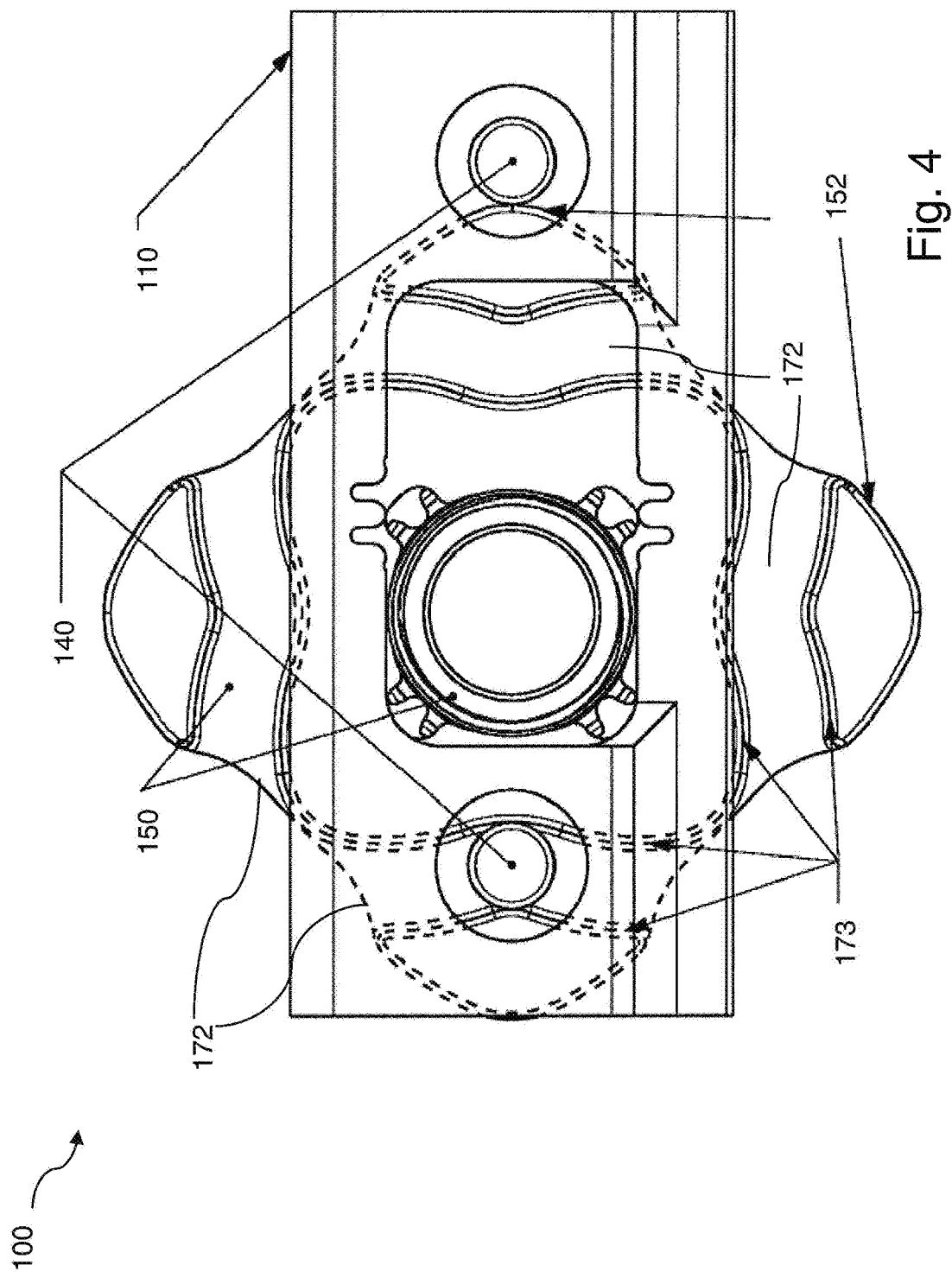
FIGS. 4-7 are schematic partial illustrations of an exemplary embodiment of a motion conversion apparatus during operation over four respective phases of a 90-degree counterclockwise rotation of the gearshaft member.

FIG. 4 shows an exemplary embodiment of a motion conversion apparatus 100 at a configuration defined herein as corresponding to 0 degrees of counterclockwise rotation of the gearshaft member 150 relative to the rodrack assembly 110. This phase is an example of TDC at the right end. Lobes 152 are located on the outside of each section of the interrupted central periodic groove 172, which includes groove wall surfaces 173. At this phase, one lobe 152 is associated with the section of the interrupted central periodic groove 172 that is diametrically opposed, to provide for synchronous movement of both surfaces. In exemplary embodiments, each guide member 140 can thus engage simultaneously with a corresponding surface of the gearshaft member 150.

Figure 5:
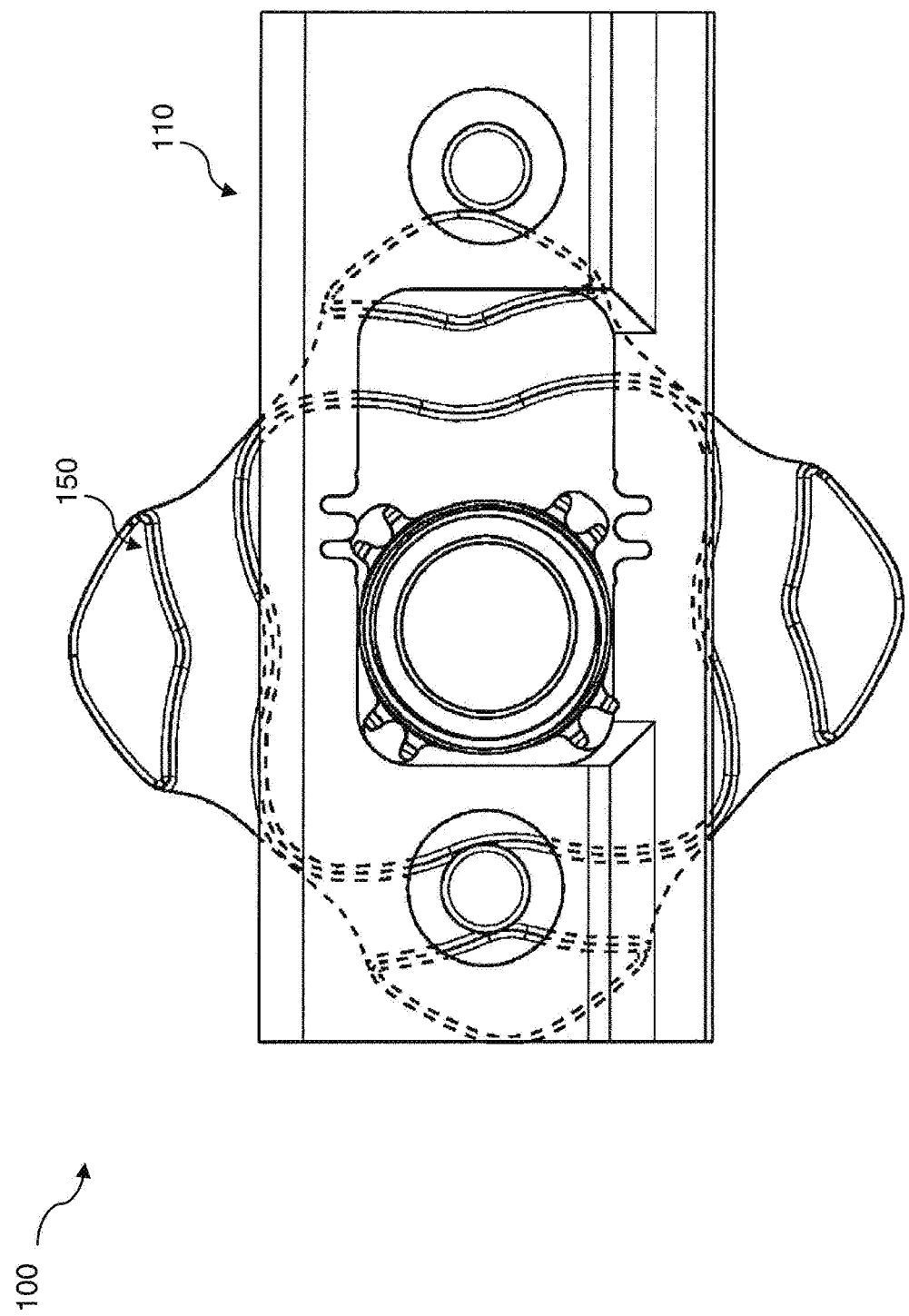

FIG. 5 shows an exemplary embodiment of a motion conversion apparatus 100 at about 4 degrees of counterclockwise rotation of the gearshaft member 150 relative to the rodrack assembly 110. Both guide members 140 are engaged with corresponding surfaces of the gearshaft member 150, and the rodrack assembly 110 has moved to the left from TDC (illustrated in FIG. 4). In alternative illustrative embodiments, the movement from FIG. 4 to FIG. 5 can be accomplished by the gearshaft member 150 rotating to move the rodrack assembly 110, or alternatively the rodrack assembly 110 could be moved linearly to rotate the gearshaft member 150.

Figure 6:
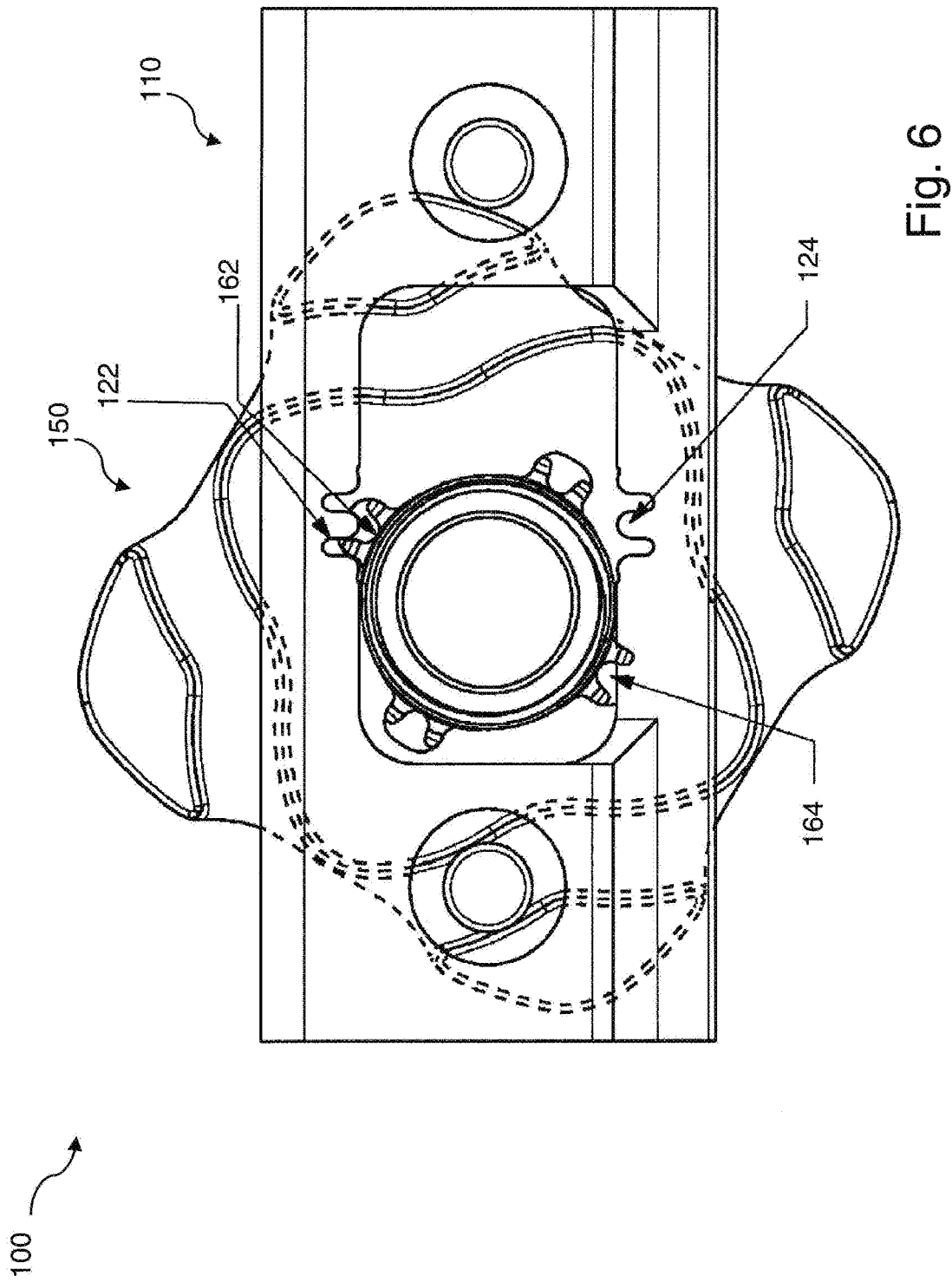

FIG. 6 shows an exemplary embodiment of a motion conversion apparatus 100 at about 14 degrees of counterclockwise rotation of the gearshaft member 150 relative to the rodrack assembly 110. Both guide members 140 remain engaged with corresponding surfaces of the gearshaft member 150, and the rodrack assembly 110 has continued to move to the left relative to TDC (illustrated in FIG. 4). At this phase, the gear engagement 162 of the gearshaft member 150 is partially engaged with the gear engagement 122 of the rodrack assembly 110. The opposite gear engagement 124 of the rodrack assembly 110 and the offset gear engagement 164 of the gearshaft member 150 pass each other without contact as a result of the parallel offset bottom rail of the rodrack assembly 110.

Figure 7:
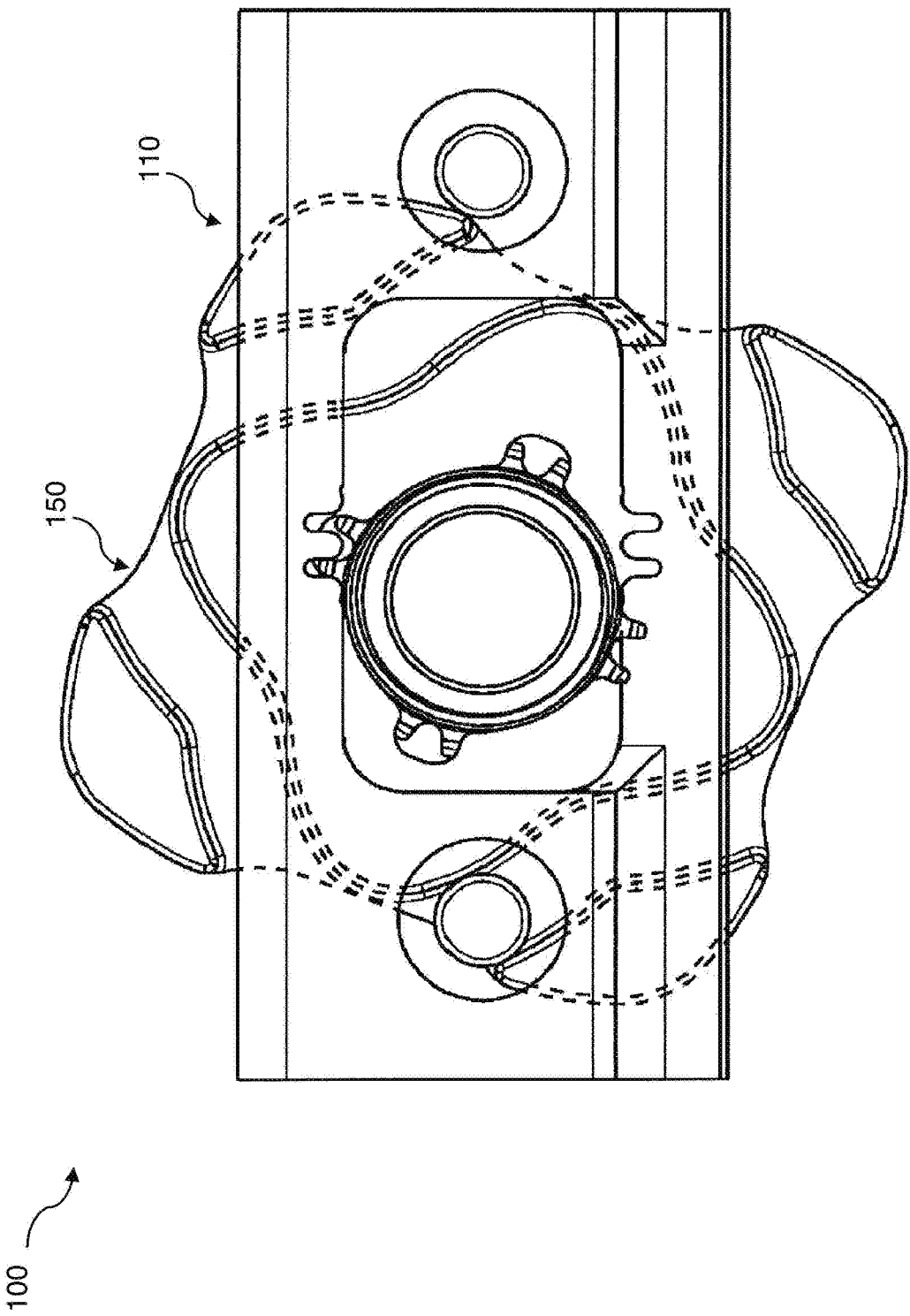

FIG. 7 shows an exemplary embodiment of a motion conversion apparatus 100 at about 24 degrees of counterclockwise rotation of the gearshaft member 150 relative to the rodrack assembly 110. The rodrack assembly 110 has continued to move to the left relative to TDC (illustrated in FIG. 4). At this phase, the gear engagement 162 of the gearshaft member 150 is more fully engaged with the gear engagement 122 of the rodrack assembly 110 than was the case in FIG. 6. Both guide members 140 release contact with their corresponding surfaces of the gearshaft member 150. The guide members 140 will be free from control of gearshaft member 150 surfaces until the continued gearshaft member 150 rotation and rodrack assembly 110 movement approach about 24-degrees before BDC. At this point a mirror image of the above-described motion between the gearshaft member 150 and the rodrack assembly 110 will begin, and the cycle will repeat in the same linear direction until reaching BDC.

Figure 8:
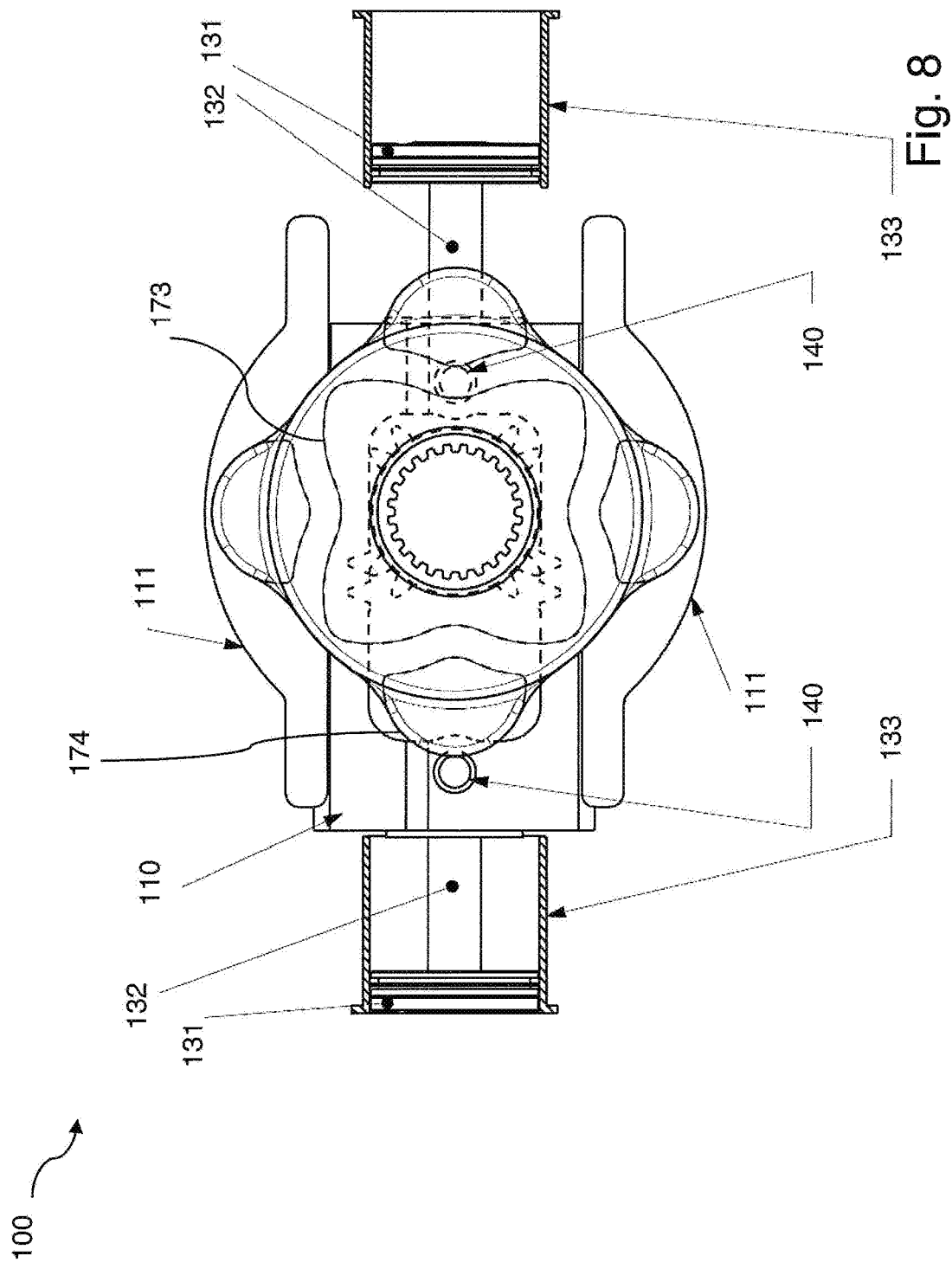
FIG. 8 is a schematic partial illustration of an exemplary embodiment of a motion conversion apparatus.

FIG. 8 shows an exemplary embodiment of a motion conversion apparatus 100. Piston heads 131 are attached to the rodrack assembly 110 by link rods 132 and are configured to be linearly displaced within stationary cylinder sleeves 133. Linear bearings 111 are stationary and are configured to guide the linear motion of the rodrack assembly 110. Guide members 140 are mounted with bearings in the rodrack assembly 110 so as to rotate relative to the rodrack assembly 110. Surfaces 173, 174 of the gearshaft member 150 are positioned directly opposite each other and maintain a specific distance so as to keep the guide members 140 in contact until gear engagements of the gearshaft member 150 and the rodrack assembly 110 are engaged. Specifically, in an exemplary embodiment, one guide member 140 contacts an inside surface 173 of the groove 172 (i.e., the surface 173 closest to the gearshaft member 150), while another guide member 140 contacts an opposite lobe 152.

FIGS. 9-21 show an exemplary embodiment of a motion conversion apparatus 100 during twelve respective phases spanning 180 degrees of clockwise rotation of the gearshaft member.

Figure 9:
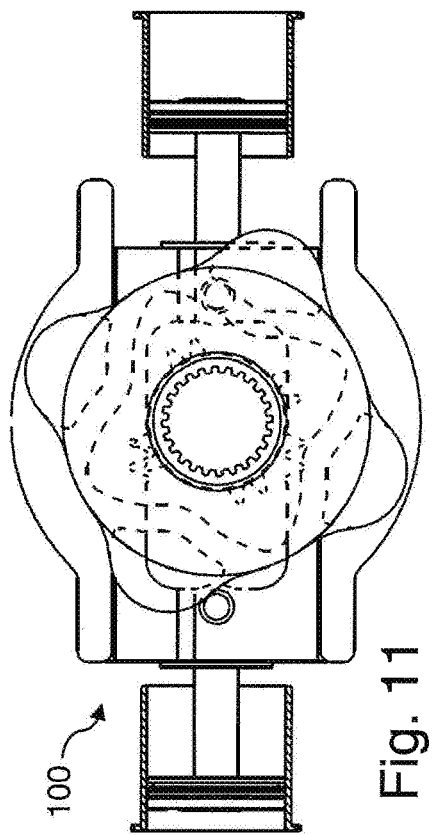
FIGS. 9-21 are schematic partial illustrations of an exemplary embodiment of a motion conversion apparatus during twelve respective phases spanning 180 degrees of clockwise rotation of the gearshaft member.

Like FIG. 8, FIG. 9 shows an exemplary embodiment of a motion conversion apparatus 100 in a TDC configuration at about 0 degrees of rotation of the gearshaft member 150.

Figure 10:
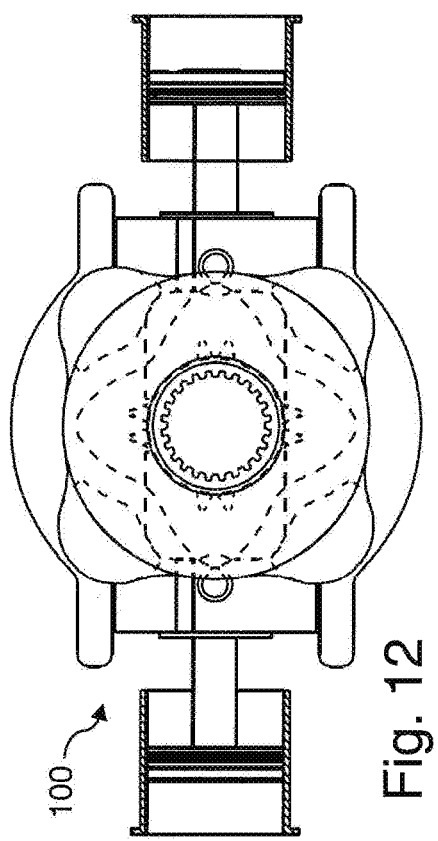

FIG. 10 shows an exemplary embodiment of a motion conversion apparatus 100 at about 15 degrees of rotation of the gearshaft member 150. Gear engagements of the gearshaft member 150 and the rodrack assembly 110 are beginning to engage at the top rail of the rodrack assembly 110. Movement of the rodrack assembly 110 to the right is controlled by guide members 140 contacting surfaces of the gearshaft member 150, and less so by the engaging gear engagements.

Figure 11:
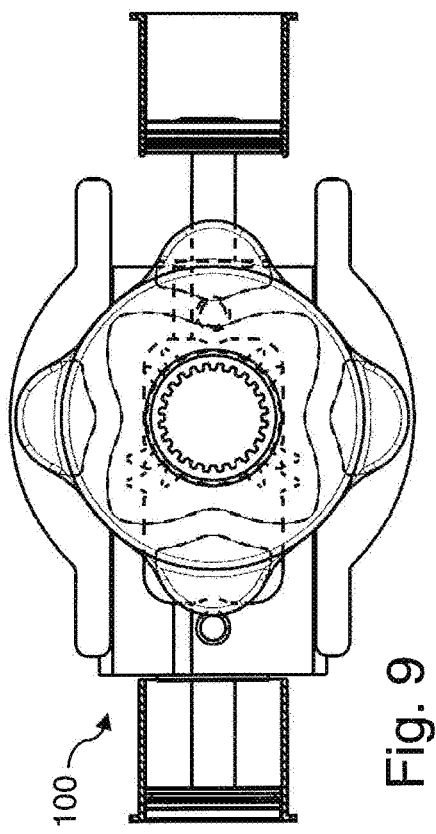

FIG. 11 shows an exemplary embodiment of a motion conversion apparatus 100 at about 20 degrees of rotation of the gearshaft member 150. The gear engagements of the gearshaft member 150 and the rodrack assembly 110 at the top rail of the rodrack assembly 110 are more fully engaged. Movement of the rodrack assembly 110 to the right is controlled by guide members 140 contacting surfaces of the gearshaft member 150, as well as by the engaging gear engagements.

Figure 12:
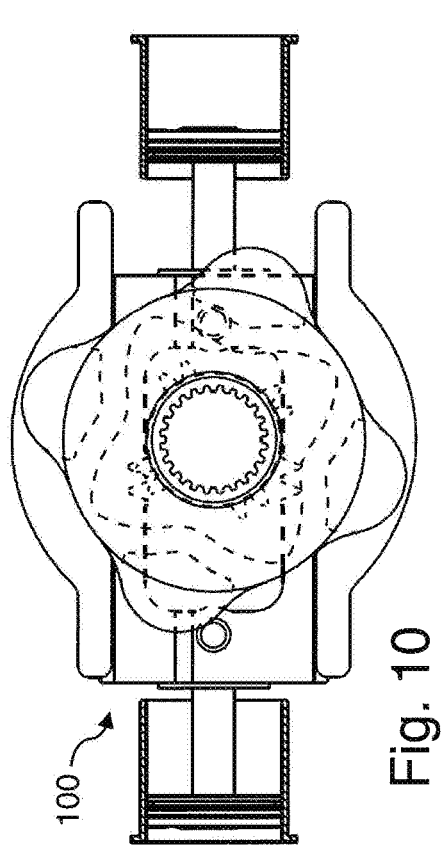

FIG. 12 shows an exemplary embodiment of a motion conversion apparatus 100 at about 45 degrees of rotation of the gearshaft member 150. The gear engagements of the gearshaft member 150 and the rodrack assembly 110 at the top rail of the rodrack assembly 110 are even more fully engaged. Movement of the rodrack assembly 110 to the right is controlled by the engaging gear engagements. The guide members 140 are no longer engaged with the surfaces of the gearshaft member 150.

Figure 13:
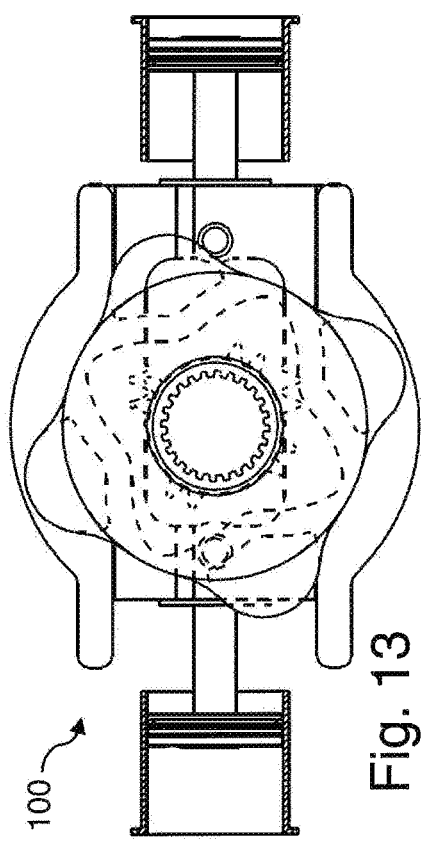

FIG. 13 shows an exemplary embodiment of a motion conversion apparatus 100 at about 70 degrees of rotation of the gearshaft member 150. The gear engagements of the gearshaft member 150 and the rodrack assembly 110 at the top rail of the rodrack assembly 110 are still engaged. Movement of the rodrack assembly 110 to the right is controlled by guide members 140 beginning to contact surfaces of the gearshaft member 150, as well as by the engaging gear engagements.

Figure 14:
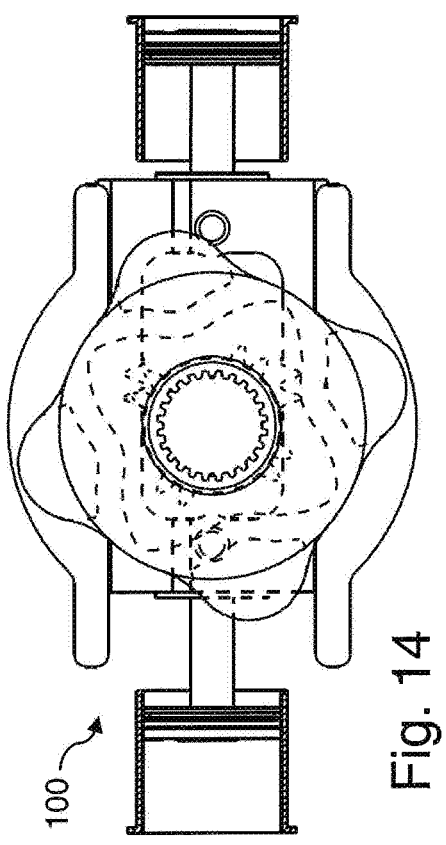

FIG. 14 shows an exemplary embodiment of a motion conversion apparatus 100 at about 80 degrees of rotation of the gearshaft member 150. Gear engagements of the gearshaft member 150 and the rodrack assembly 110 are beginning to disengage at the top rail of the rodrack assembly 110. Movement of the rodrack assembly 110 to the right is controlled by guide members 140 contacting surfaces of the gearshaft member 150, and less so by the engaging gear engagements.

Figure 15:
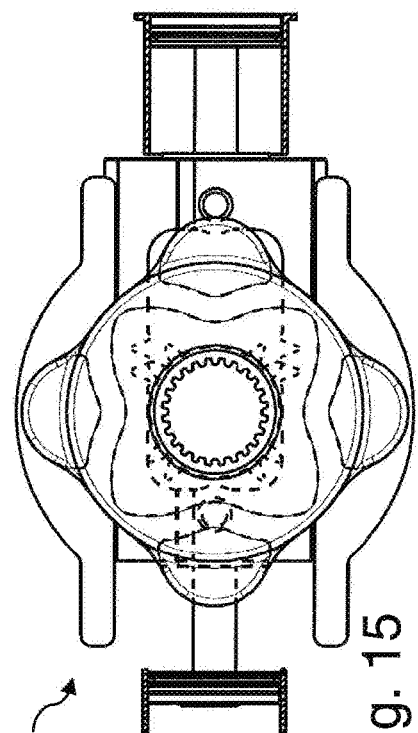

FIG. 15 shows an exemplary embodiment of a motion conversion apparatus 100 at about 90 degrees of rotation of the gearshaft member 150. The rodrack assembly 110 has moved to the right, and the motion conversion apparatus 100 is now at BDC on the left and TDC on the right. Gear engagements of the gearshaft member 150 and the rodrack assembly 110 are disengaged. Movement of the rodrack assembly 110 is controlled by guide members 140 contacting surfaces of the gearshaft member 150.

Figure 16:
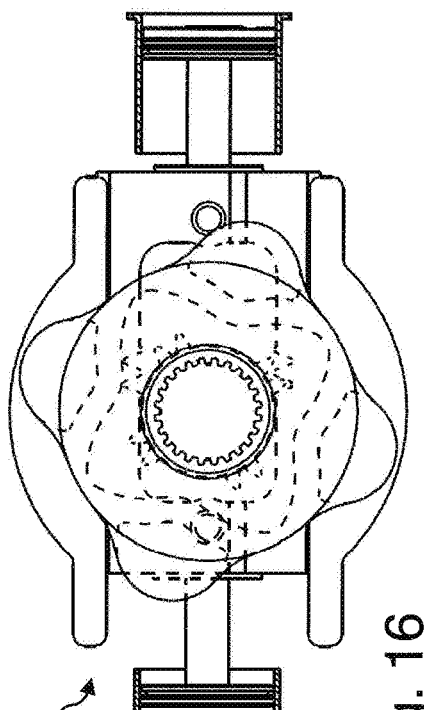

FIG. 16 shows an exemplary embodiment of a motion conversion apparatus 100 at about 105 degrees of rotation of the gearshaft member 150. The rodrack assembly 110 is now moving left. Gear engagements of the gearshaft member 150 and the rodrack assembly 110 are beginning to engage at the bottom rail of the rodrack assembly 110. Movement of the rodrack assembly 110 to the left is controlled by guide members 140 contacting surfaces of the gearshaft member 150, and less so by the engaging gear engagements.

Figure 17:
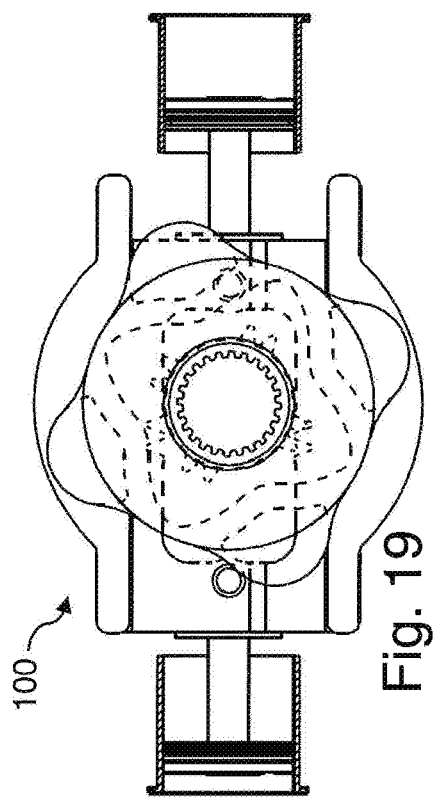

FIG. 17 shows an exemplary embodiment of a motion conversion apparatus 100 at about 110 degrees of rotation of the gearshaft member 150. The gear engagements of the gearshaft member 150 and the rodrack assembly 110 at the rail of the rodrack assembly 110 are more fully engaged. Movement of the rodrack assembly 110 to the left is controlled by guide members 140 contacting surfaces of the gearshaft member 150, as well as by the engaging gear engagements.

Figure 18:
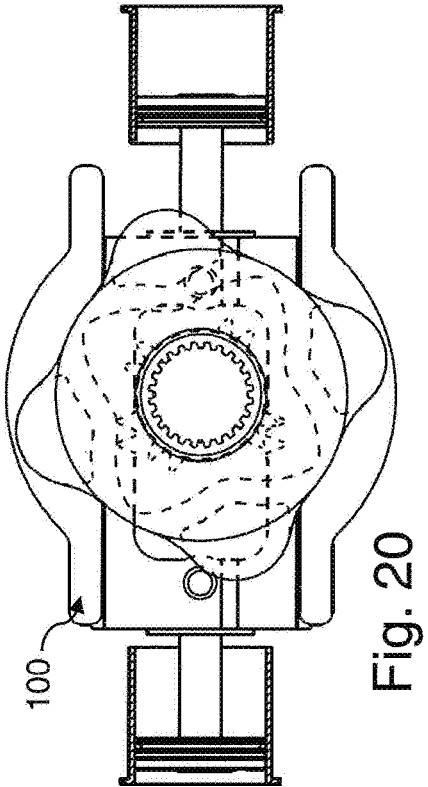

FIG. 18 shows an exemplary embodiment of a motion conversion apparatus 100 at about 135 degrees of rotation of the gearshaft member 150. The gear engagements of the gearshaft member 150 and the rodrack assembly 110 at the bottom rail of the rodrack assembly 110 are even more fully engaged. Movement of the rodrack assembly 110 to the left is controlled by the engaging gear engagements. The guide members 140 are no longer engaged with the surfaces of the gearshaft member 150.

Figure 19:
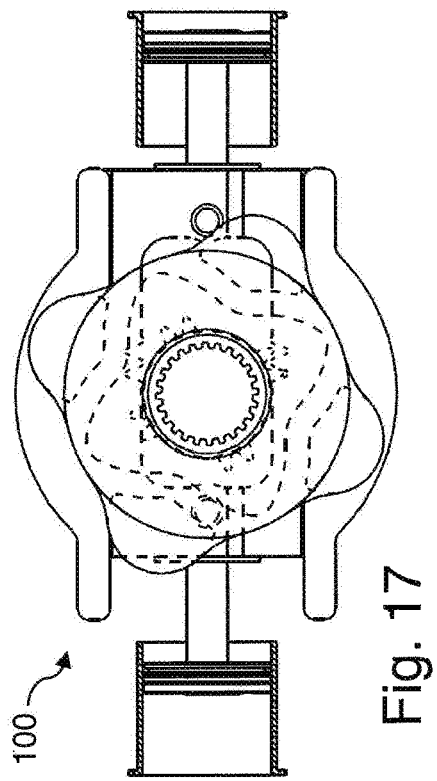

FIG. 19 shows an exemplary embodiment of a motion conversion apparatus 100 at about 160 degrees of rotation of the gearshaft member 150. The gear engagements of the gearshaft member 150 and the rodrack assembly 110 at the bottom rail of the rodrack assembly 110 are still engaged. Movement of the rodrack assembly 110 to the left is controlled by guide members 140 beginning to contact surfaces of the gearshaft member 150, as well as by the engaging gear engagements.

Figure 20:
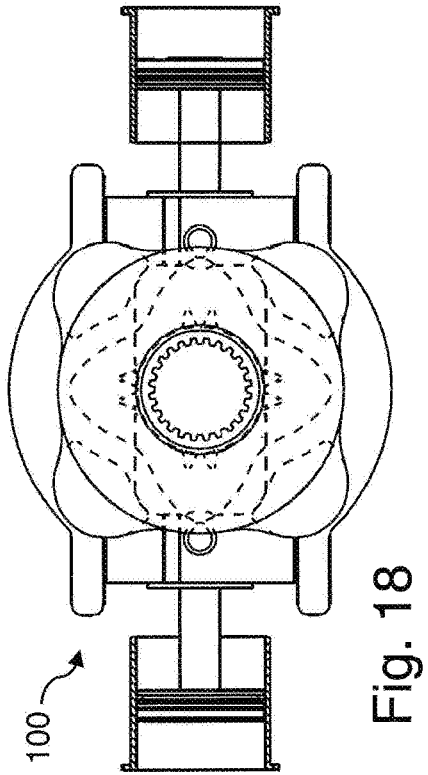

FIG. 20 shows an exemplary embodiment of a motion conversion apparatus 100 at about 170 degrees of rotation of the gearshaft member 150. Gear engagements of the gearshaft member 150 and the rodrack assembly 110 are beginning to disengage at the bottom rail of the rodrack assembly 110. Movement of the rodrack assembly 110 to the left is controlled by guide members 140 contacting surfaces of the gearshaft member 150, and less so by the engaging gear engagements.

Figure 21:
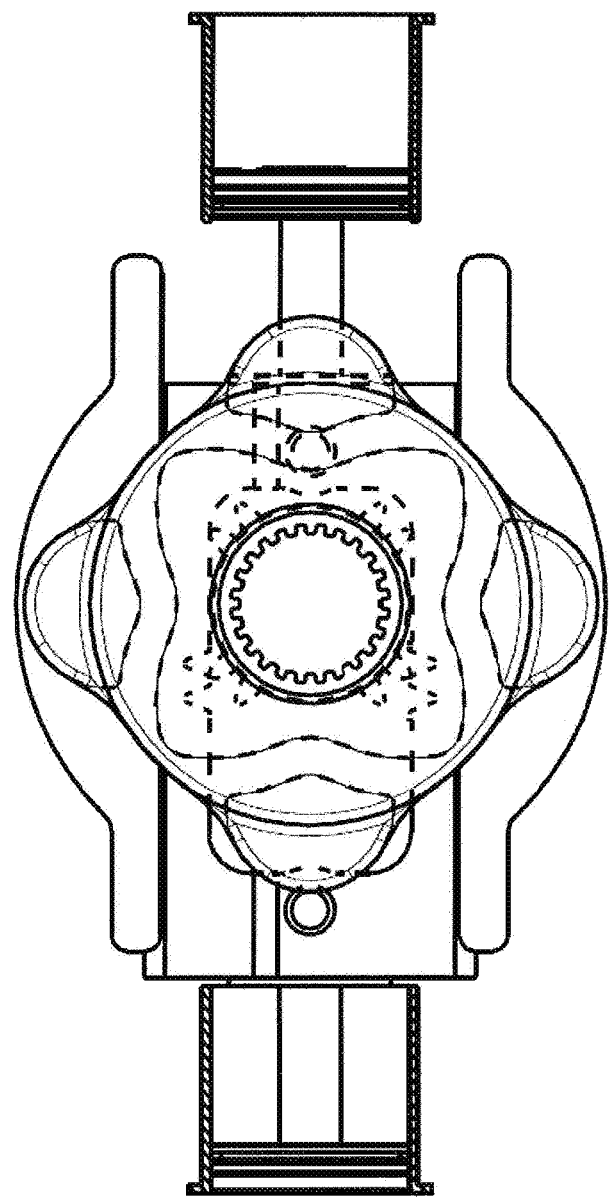

FIG. 21 shows an exemplary embodiment of a motion conversion apparatus 100 at about 180 degrees of rotation of the gearshaft member 150. The rodrack assembly 110 has moved to the left, and the motion conversion apparatus 100 is now in a TDC configuration on the left and a BDC configuration on the right. Gear engagements of the gearshaft member 150 and the rodrack assembly 110 are disengaged. Movement of the rodrack assembly 110 is controlled by guide members 140 contacting surfaces of the gearshaft member 150.

Figure 22:
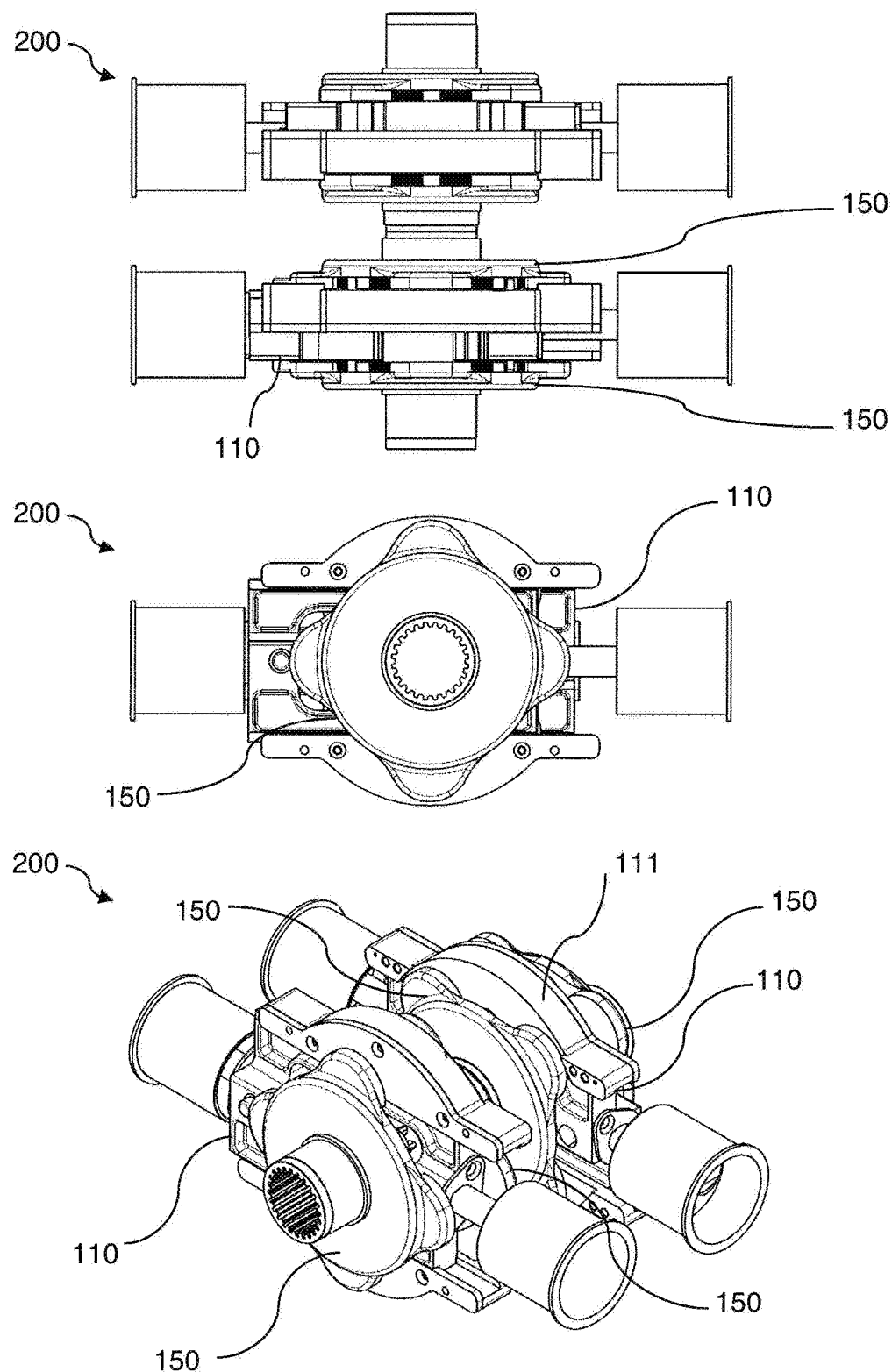
FIG. 22 shows schematic partial illustrations of an exemplary embodiment of a motion conversion apparatus including multiple rodrack assemblies and gearshaft members.

FIG. 22 shows schematic partial illustrations of an exemplary embodiment of a motion conversion apparatus 200 including multiple rodrack assemblies 110 and gearshaft members 150. The gearshaft members 150 are configured to rotate together about the rotational axis A, while the rodrack assemblies 110 can be configured to either linearly translate together or in opposite directions, depending on the offset configuration of their respective gear connection members relative to the offset configuration of the gear connection members of the corresponding gearshaft members 150. Because each rodrack assembly 110 is located between two gearshaft members 150, opposite protruding ends of a guide member 140 can engage with a respective gearshaft member 150.

Figure 23:
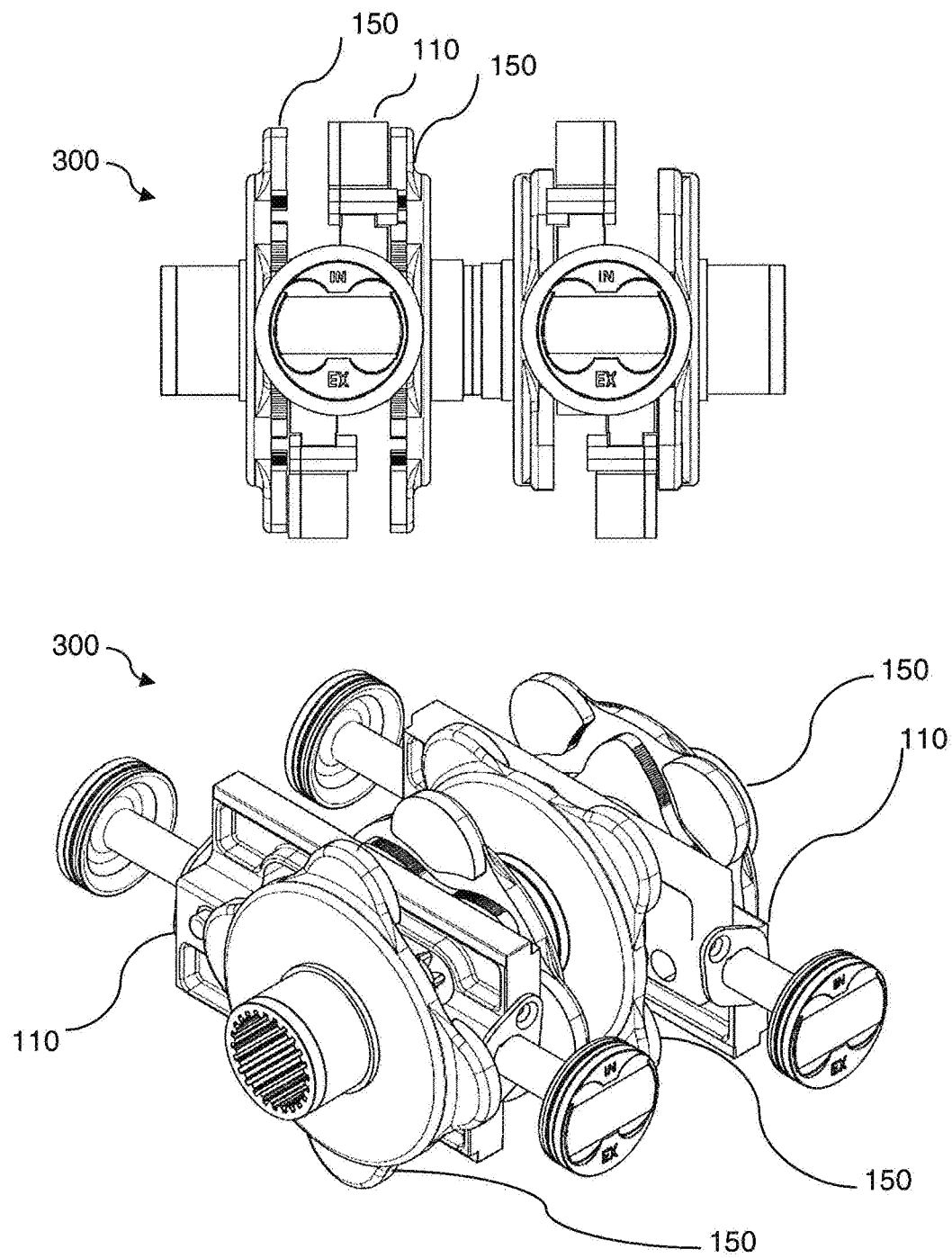
FIG. 23 shows schematic partial illustrations of an exemplary embodiment of a motion conversion apparatus including multiple rodrack assemblies and gearshaft members.

FIG. 23 shows schematic partial illustrations of an exemplary embodiment of a motion conversion apparatus 300 including multiple rodrack assemblies 110 and gearshaft members 150.

In exemplary embodiments, the motion conversion apparatus 100 provides an efficient way to convert continuous rotary motion to linear motion and vice versa, and provides increased transfer of power during linear-to-rotational motion conversion compared to known systems.

Figure 24A:
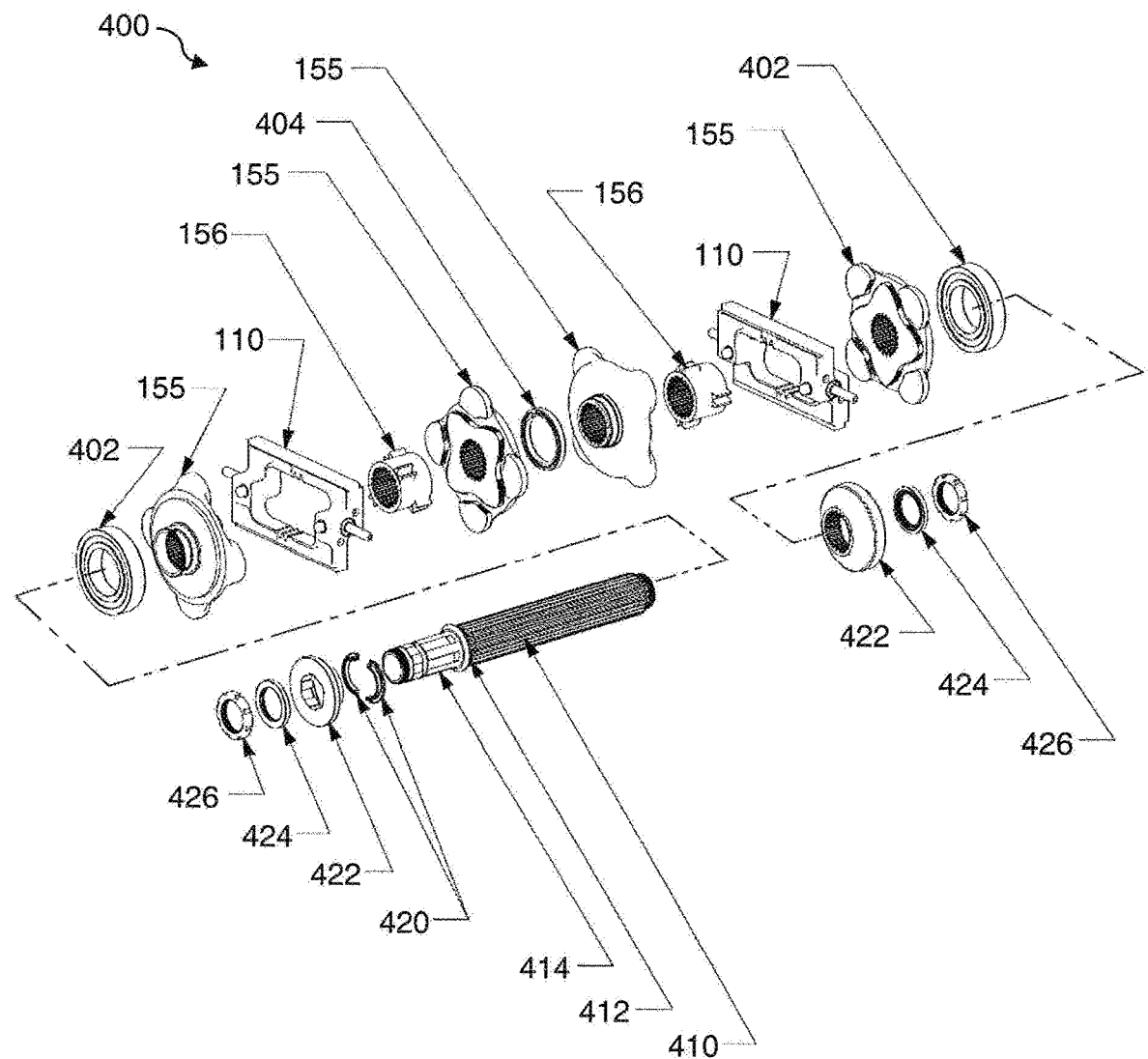
FIG. 24A shows a schematic exploded view of an exemplary embodiment of a motion conversion apparatus including multiple rodrack assemblies and gearshaft members, and a splined shaft, with a 45-degree rotational offset between sets.
Figure 25:
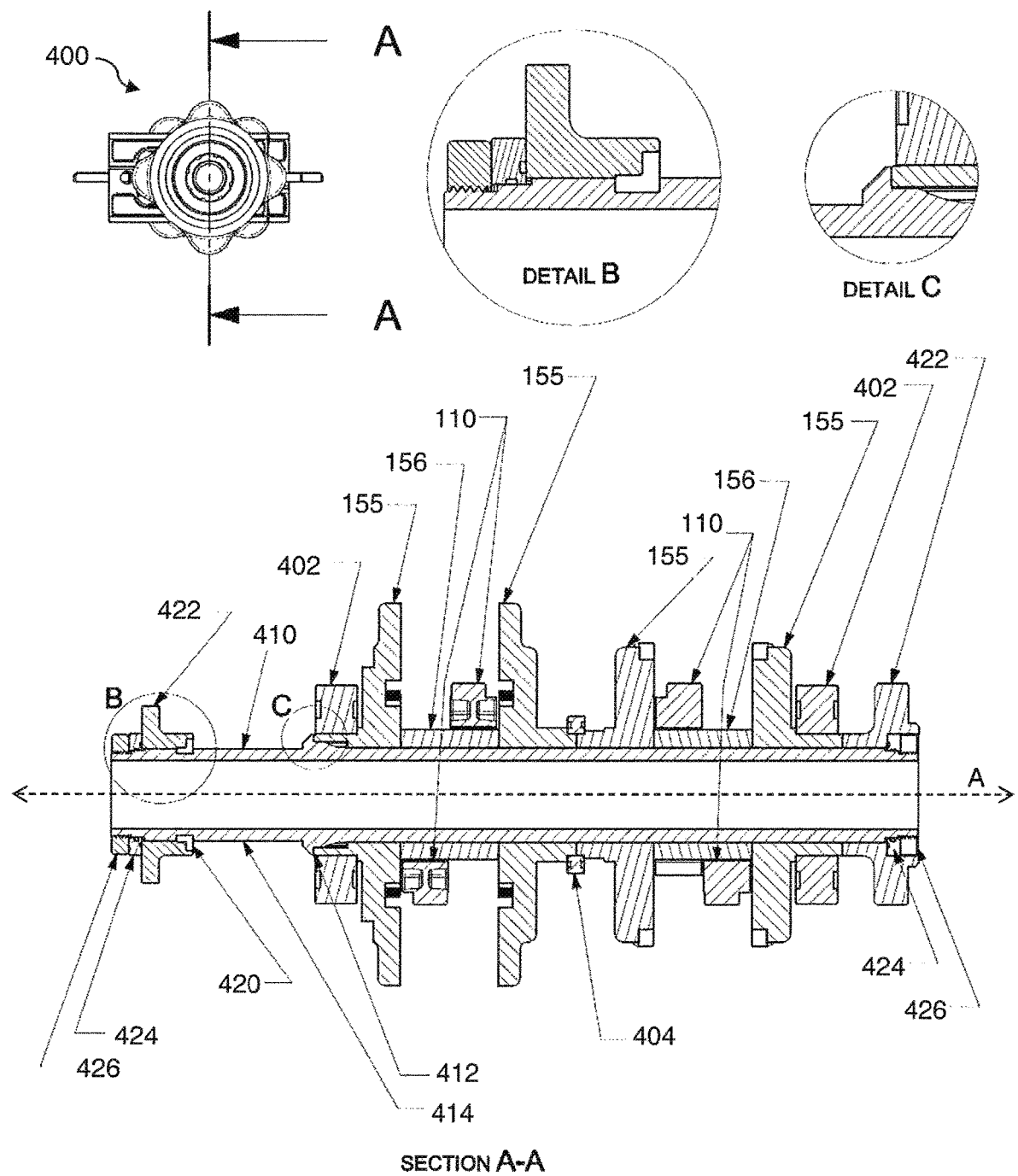
FIG. 25 shows schematic views of an exemplary embodiment of a motion conversion apparatus including multiple rodrack assemblies and gearshaft members, and a splined shaft.

FIG. 24A shows a schematic exploded view of an exemplary embodiment of a motion conversion apparatus 400 including multiple rodrack assemblies and gearshaft members, and including a splined shaft, as described further below. FIG. 25 shows schematic views of an exemplary embodiment of a motion conversion apparatus 400 including multiple rodrack assemblies and gearshaft members, and including a splined shaft.

As previously described, in an exemplary embodiment, a gearshaft member 150 comprises a second gear connection member 160 and a guiding surface arrangement 170. In an exemplary embodiment, the guiding surface arrangement 170 is located at an end section 155 of a gearshaft member 150, while the second gear connection member 160 is located at a mid section 156 of the second gear connection member 160, and a mid section 156 is located between two end sections 155.

Figure 24B:
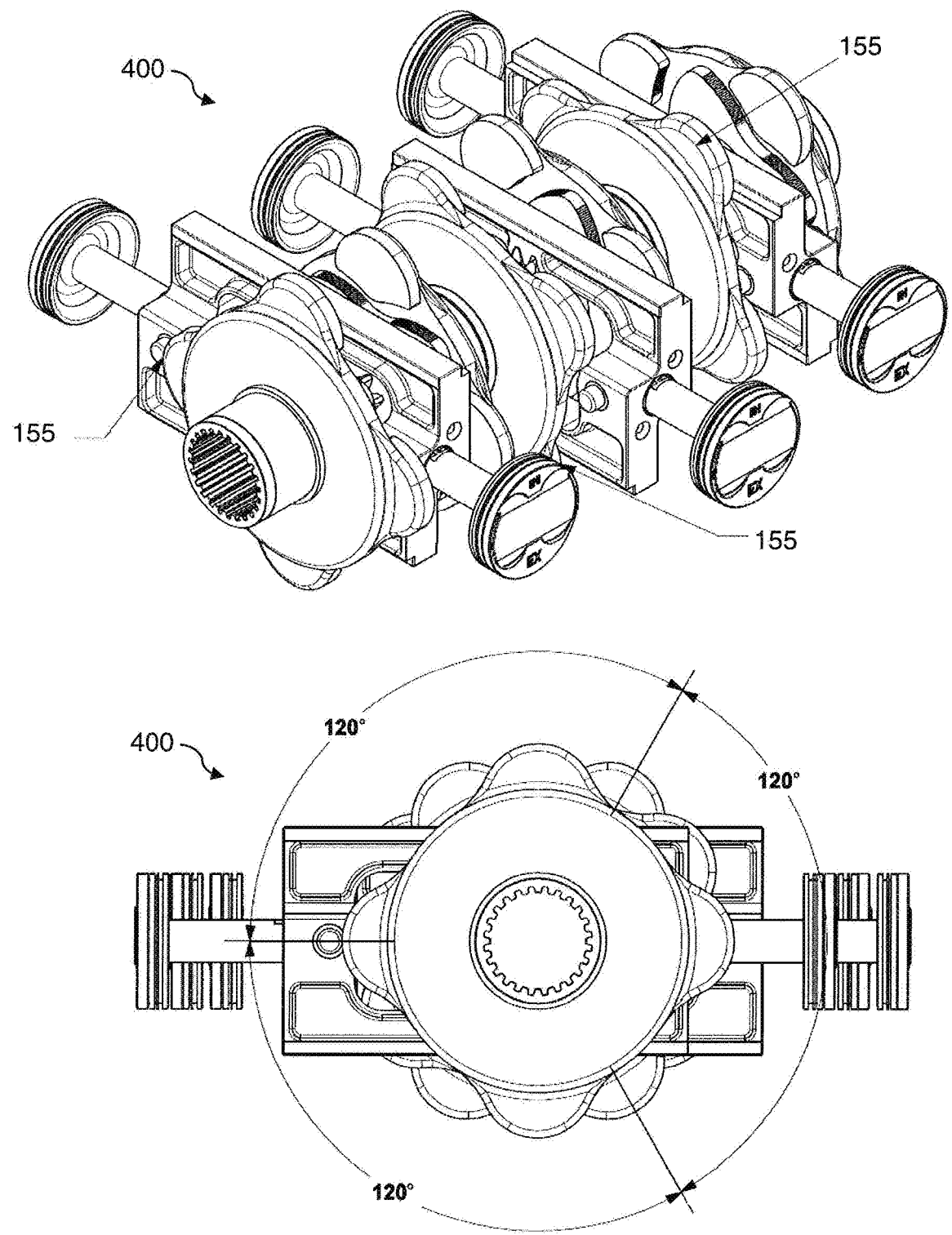
FIG. 24B shows a schematic exploded view of an exemplary embodiment of a motion conversion apparatus including multiple rodrack assemblies and gearshaft members, and a splined shaft, with a 120-degree rotational offset between sets.

In an exemplary embodiment, the motion conversion apparatus 400 includes, between two end bearings 402, a first set comprising a first gearshaft member end section 155, a rodrack assembly 110, a gearshaft member mid section 156, and a second gearshaft member end section 155. In an exemplary embodiment, the motion conversion apparatus 400 includes a second set of a gearshaft member end section 155, a rodrack assembly 110, a gearshaft member mid section 156, and a gearshaft member end section 155 aligned with the first set along the rotational axis A, and separated from the first set by a mid bearing 404, as shown for example in FIGS. 24A and 25. In an exemplary embodiment of a motion conversion apparatus 400 including two sets, the sets are rotationally offset by 45 degrees with respect to one another (as shown for example in FIG. 24A). In an exemplary embodiment of a motion conversion apparatus 400 including three sets, the sets are rotationally offset by 120 degrees with respect to one another (as shown for example in FIG. 24B). In exemplary embodiments, motion conversion apparatuses can include any number of sets, offset by any amount so as to be out of phase. The number of splines on the splined shaft 410 can help facilitate the relative rotational offset of the sets. For example, a two-set assembly in which the sets are rotationally offset by 45 degrees can be achieved with a splined shaft having 8 splines, or any multiple of 8 which is a factor of 360. Likewise, a three-set assembly in which the sets are rotationally offset by 120 degrees can be achieved with a splined shaft having 3 teeth or any multiple of 3 which is a factor of 360.

In an exemplary embodiment, the motion conversion apparatus 400 further includes a splined shaft 410 extending through the set(s). The splined shaft 410 provides for collinear alignment and rotational indexing of the gearshaft member end sections 155 and the gearshaft member mid section 156.

In an exemplary embodiment, the splined shaft 410 is coupled to the gearshaft member end sections 155 and the gearshaft member mid section 156 so that the splined shaft 410, the gearshaft member end sections 155 and the gearshaft member mid section 156 are configured to rotate together about the rotational axis A. In exemplary embodiments, the splined shaft 410 is arranged in the motion conversion apparatus 400 with flange nuts 426 (which threadedly engage with the splined shaft), seal plate rings 424, end flanges 422, and split lock rings 420. In an exemplary embodiment, the splined shaft 410 includes a stop flange 412 to form a positive stop for the assembly (e.g., for the flange 402 as shown in FIG. 25). In the exemplary embodiment shown in FIG. 25, the sets are axially held between the stop flange 412 of the splined shaft 410 and an end flange 422, which in turn is axially stopped by a flange nut 426. In an exemplary embodiment, the splined shaft 410 includes an accessory end 414 to engage with other devices, such as, but not limited to pumps, pulleys, etc.

Figure 26:
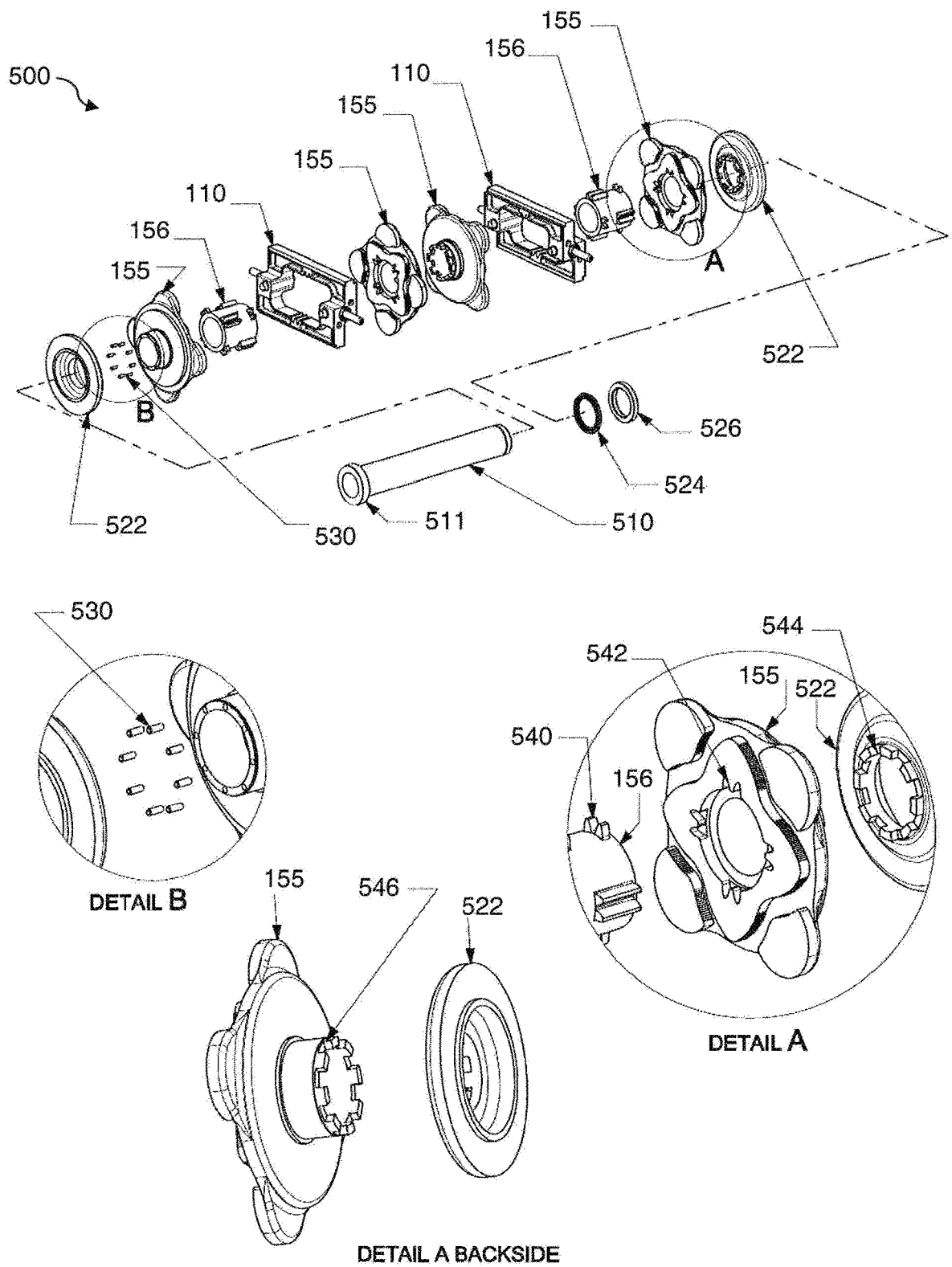
FIG. 26 shows a schematic exploded view of an exemplary embodiment of a motion conversion apparatus including multiple rodrack assemblies and gearshaft members, and a smooth shaft.
Figure 27:
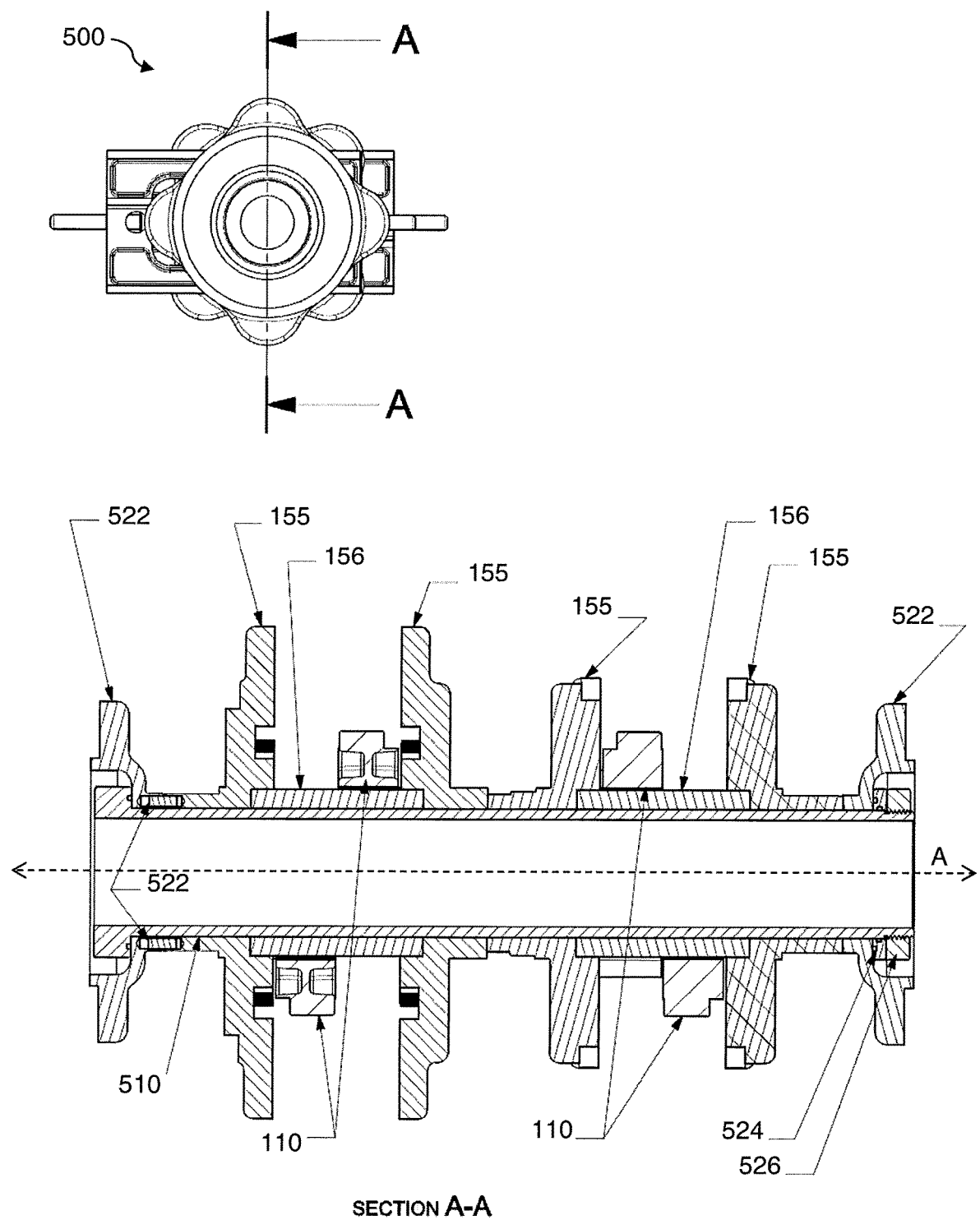
FIG. 27 shows schematic views of an exemplary embodiment of a motion conversion apparatus including multiple rodrack assemblies and gearshaft members, and a smooth shaft.

FIG. 26 shows a schematic exploded view of an exemplary embodiment of a motion conversion apparatus 500 including multiple rodrack assemblies and gearshaft members, and including a smooth shaft, as described further below. FIG. 27 shows schematic views of an exemplary embodiment of a motion conversion apparatus 500 including multiple rodrack assemblies and gearshaft members, and including a smooth shaft. This configuration can allow for the removal and service of accessories and the end flange without disturbing the internal components of the assembly.

In an exemplary embodiment, the motion conversion apparatus 500 includes, between two end flanges 522, a first set comprising a first gearshaft member end section 155, a rodrack assembly 110, a gearshaft member mid section 156, and a second gearshaft member end section 155. In an exemplary embodiment, the motion conversion apparatus 500 includes a second set of a gearshaft member end section 155, a rodrack assembly 110, a gearshaft member mid section 156, and a gearshaft member end section 155, as shown for example in FIGS. 26 and 27. In an exemplary embodiment of a motion conversion apparatus 500 including two sets, the sets are rotationally offset by 45 degrees with respect to one another (as shown for example in FIG. 26). In an exemplary embodiment of a motion conversion apparatus 500 including three sets, the sets are rotationally offset by 120 degrees with respect to one another. In exemplary embodiments, motion conversion apparatuses can include any number of sets, offset by any amount so as to be out of phase.

In an exemplary embodiment, the motion conversion apparatus 500 further includes a smooth shaft 510 extending through the set(s).

In an exemplary embodiment, the smooth shaft 510 does not rotationally engage with the gearshaft member sections. Rather, in exemplary embodiments, pins of teeth arrangements rotationally index rotating parts.

In an exemplary embodiment, the end flanges 522 are coupled to respective gearshaft member end sections 155 by pins 530 or axially extending teeth 544, 546, as shown for example in FIG. 26, so that the end flanges 522 and the respective gearshaft member end sections 155 are configured to rotate together about the rotational axis A. Alternatively, the end flanges 522 are coupled to respective gearshaft member end sections 155 by teeth 540 and teeth sockets 542.

In an exemplary embodiment, the gearshaft member end sections 155 are coupled to respective gearshaft member mid sections 156 by teeth 540 and teeth sockets 542, as shown for example in FIG. 26, so as to rotate together about the rotational axis A. Alternatively, the gearshaft member end sections 155 are coupled to respective gearshaft member mid sections 156 by pins 530 or axially extending teeth 544, 546.

Figure 28:
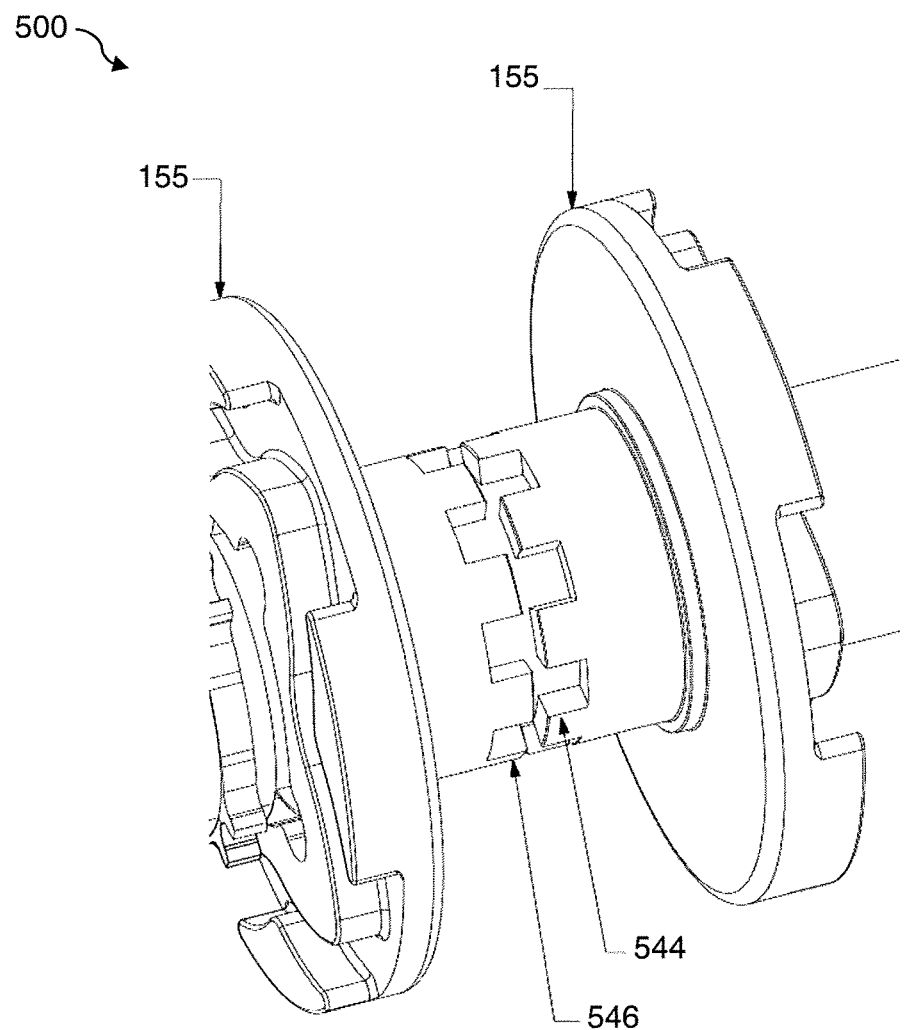
FIG. 28 shows a schematic view of an exemplary embodiment of a motion conversion apparatus including two gearshaft member end sections coupled by a teeth arrangement.

In an exemplary embodiment, the gearshaft member end section 155 of one set, is coupled to the gearshaft member end section 155 of another set by axially extending teeth 544, 546, as shown for example in FIG. 28, so as to rotate together about the rotational axis A. Alternatively, the gearshaft member end section 155 of one set is coupled to the gearshaft member end section 155 of another set by pins 530, or teeth 540 and teeth sockets 542.

In exemplary embodiments, the smooth shaft 510 includes a lip portion 511 for sealing against one end of the motion conversion apparatus 500.

In exemplary embodiments, the smooth shaft 510 is arranged in the motion conversion apparatus 500 with a flange nut 526 (which threadedly engages with the smooth shaft 510), and a seal plate ring 524.

In exemplary embodiments, such couplings provide for precise rotational alignment and indexing.

Figure 29:
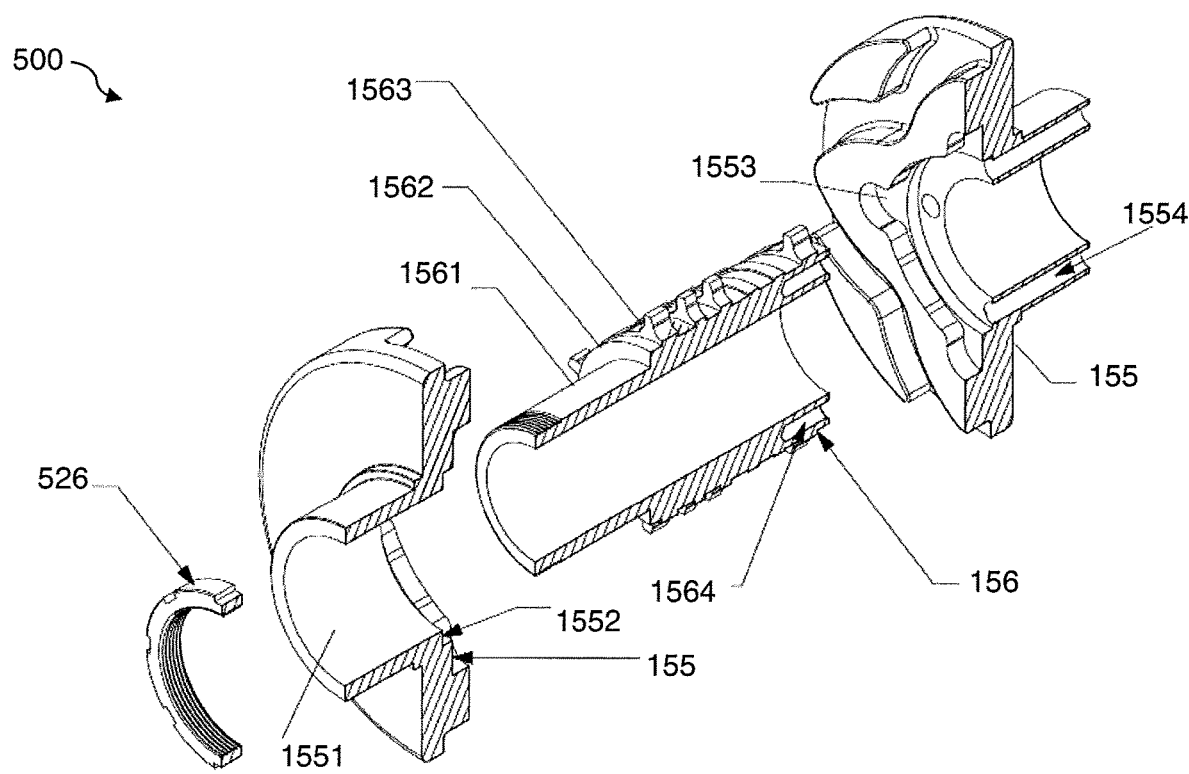
FIG. 29 shows a schematic view of an exemplary embodiment of a motion conversion apparatus including two gearshaft member end sections coupled by a gearshaft member mid section.

FIG. 29 shows an exemplary embodiment including two gearshaft member end sections 155 coupled by a gearshaft member mid section 156. The end portion 1561 of the gearshaft member mid section 156 is slidable through a bore 1551 of the first gearshaft member end section 155. A step or ledge 1562 of the gearshaft member mid section 156 is configured to contact a step or ledge 1552 of the first gearshaft member end section 155. A locking tooth 1563 of the gearshaft member mid section 156 is configured to couple to a locking pocket 1553 of the second gearshaft member end section 155 to control the index relationship of the mid section 156 and the second end section 155. On one side (the side of the first end section 155), an end nut 526 is configured to hold the components tightly together by threading onto the end portion 1561 of the gearshaft member mid section 156. On the other side (the side of the second end section 156), a series of through holes 1554 and threaded holes 1564 are configured to receive threaded bolts (not shown) to hold the components tightly together. In alternative exemplary embodiments, the same type of tightening mechanism (e.g., end nut and threaded end portion, or through holes, threaded holes and threaded bolts) is used on both sides of the gearshaft member mid section 156.

In exemplary embodiments, advantages of manufacturing the motion conversion apparatus in multiple pieces as illustrated for example in FIGS. 24A-29 include higher accuracy in the working surfaces of the motion conversion apparatus (e.g., the guiding surfaces, and gear teeth/grooves, etc.). These working surfaces would be more difficult to accurately produce using conventional methods (e.g., machining, milling, etc.), if the motion conversion apparatus were made in two pieces. In an exemplary embodiment, however, multiple pieces can be accurately formed as a single piece by 3D printing. For example, FIG. 3 shows a gearshaft member end section and a gearshaft member mid section integrally formed as one piece.

In exemplary embodiments, the motion conversion apparatus 100 can form a part of an internal combustion engine assembly, a pump assembly (such as, but not limited to a hydraulic and/or fracturing pump), a compressor assembly, or any other device involving linear-to-rotational motion conversion or rotational-to-linear motion conversion. As such, in exemplary embodiments, an internal combustion engine assembly comprises the motion conversion apparatus 100 as described herein, a pump assembly comprises the motion conversion apparatus 100 as described herein, and a compressor assembly comprises the motion conversion apparatus 100 as described herein.

In exemplary embodiments, the internal combustion engine assembly, the pump assembly, the compressor assembly, or any device involving linear-to-rotational motion conversion or rotational-to-linear motion conversion can include any combinations of the above-described features.

It will be appreciated by those skilled in the art that the disclosure herein can be embodied in other specific forms without departing from the spirit or essential characteristics thereof. Moreover, those skilled in the art will appreciate that the various features described herein can be combined in any arbitrary combination. The presently disclosed embodiments are therefore considered in all respects to be exemplary and not restricted. The scope of the invention is indicated by the appended claims rather than the foregoing description and all changes that come within the meaning and range and equivalence thereof are intended to be embraced therein.

What is claimed is:

1. A motion conversion apparatus (400, 500) comprising:
at least one set including:
   a rodrack assembly (110) between two gearshaft member end sections (155), the rodrack assembly (110) comprising a first gear connection member (120) and two guide members (140); and
   a gearshaft member mid section (156) between the two gearshaft member end sections (155), the gearshaft member mid section (156) comprising a second gear connection member (160) configured to engage with the first gear connection member (120),
   the two gearshaft member end sections (155) each comprising a guiding surface arrangement (170 and 174) configured to contact the two guide members (140),
   the rodrack assembly (110) being configured to provide rotation of the gearshaft member mid section (156) about a rotational axis (A) by reciprocating linear motion of the rodrack assembly (110) along a first spatial dimension (D1) orthogonal to the rotational axis (A), and/or the gearshaft member mid section (156) being configured to provide reciprocating linear motion of the rodrack assembly (110) along the first spatial dimension (D1) by rotational motion of the gearshaft member mid section (156) about the rotational axis (A),
   the guiding surface arrangement (170 and 174) being configured to simultaneously contact each of the two guide members (140) during at least a portion of the reciprocating linear motion of the rodrack assembly (110).

2. The motion conversion apparatus (400, 500) according to claim 1, wherein the at least one set includes at least two sets aligned with one another along the rotational axis (A).

3. The motion conversion apparatus (400, 500) according to claim 2, wherein the at least two sets are out of phase with respect to one another.

4. The motion conversion apparatus (400, 500) according to claim 2, wherein the at least two sets include two sets which are out of phase with one another by 45 degrees about the rotational axis (A).

5. The motion conversion apparatus (400, 500) according to claim 2, wherein the at least two sets include three sets which are out of phase with a respective other one of the three sets by 120 degrees about the rotational axis (A).

6. The motion conversion apparatus (400, 500) according to claim 1, further comprising:
   a splined shaft (410) extending through the at least one set, the splined shaft (410) being coupled to the two gearshaft member end sections (155) and the gearshaft member mid section (156) so that the splined shaft (410), the two gearshaft member end sections (155) and the gearshaft member mid section (156) are configured to rotate together about the rotational axis (A).

7. The motion conversion apparatus (400, 500) according to claim 6, wherein the at least one set is located between two end bearings (402), and the splined shaft (410) includes a stop flange (412) which abuts against one of the two end bearings (402).

8. The motion conversion apparatus (400, 500) according to claim 7, wherein the two gearshaft member end sections (155) are coupled to the gearshaft member mid sections (156) by pins (530), teeth (540) and teeth sockets (542), or axially extending teeth (544, 546), so that the two gearshaft member end sections (155) and the gearshaft member mid sections (156) are configured to rotate together about the rotational axis (A).

9. The motion conversion apparatus (400, 500) according to claim 7, wherein one of the two gearshaft member end sections (155) is coupled to an end flange (522) by pins (530), teeth (540) and teeth sockets (542), or axially extending teeth (544, 546), so that the one of the two gearshaft member end sections (155) and the end flange (522) are configured to rotate together about the rotational axis (A).

10. The motion conversion apparatus (400, 500) according to claim 7, wherein one of the two gearshaft member end sections (155) of one of the at least one set is coupled to one of the two gearshaft member end sections (155) of another one of the at least one set by pins (530), teeth (540) and teeth sockets (542), or axially extending teeth (544, 546), so that the one of the two gearshaft member end sections (155) and the other one of the two gearshaft member end sections (155) are configured to rotate together about the rotational axis (A).

11. The motion conversion apparatus (400, 500) according to claim 1, further comprising:
a smooth shaft (510) extending through the at least one set.

12. The motion conversion apparatus (400, 500) according to claim 1, wherein the guiding surface arrangement (170) comprises wall surfaces (173) of an interrupted central periodic groove (172).

13. The motion conversion apparatus (400, 500) according to claim 1, wherein each of the two guide members (140) includes two opposite ends which each protrude from opposite sides of the first gear connection member (120).

14. The motion conversion apparatus (400, 500) according to claim 1, wherein the two guide members (140) include two shafts.

15. The motion conversion apparatus (400, 500) according to claim 14, wherein the guiding surface arrangement (170) comprises wall surfaces (173) of an interrupted central periodic groove (172), and the two shafts are configured to travel within the periodic groove (172) during the reciprocating linear motion of the at least one rodrack assembly (110).

16. The motion conversion apparatus (400, 500) according to claim 14, wherein each of the two shafts is configured to spin along a longitudinal axis thereof.

17. The motion conversion apparatus (400, 500) according to claim 1, wherein the gearshaft member mid section (156) and one of the two gearshaft member end sections (155) are integrally formed as one piece.

18. An internal combustion engine assembly comprising:
the motion conversion apparatus (400, 500) according to claim 1.

19. A pump assembly comprising:
the motion conversion apparatus (400, 500) according to claim 1.

20. A hydraulic and/or fracturing pump assembly comprising:
the motion conversion apparatus (400, 500) according to claim 1.

* * * * *